US011535394B2

(12) United States Patent
Schurek et al.

(10) Patent No.: US 11,535,394 B2
(45) Date of Patent: Dec. 27, 2022

(54) AIRCRAFT LANDING ASSISTANCE METHOD AND MEMORY STORAGE DEVICE INCLUDING INSTRUCTIONS FOR PERFORMING AN AIRCRAFT LANDING ASSISTANCE METHOD

(71) Applicant: THE BOEING COMPANY, Chicago, IL (US)

(72) Inventors: Kevin G. Schurek, West Chester, PA (US); Jacob J. Kowalski, Glen Mills, PA (US); Douglas S. Fischer, Media, PA (US); Barbara A. Meredith, Swarthmore, PA (US); Lenrik E. Toval, Philadelphia, PA (US); Scott J. Brick, Mt. Laurel, NJ (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/989,793

(22) Filed: Aug. 10, 2020

(65) Prior Publication Data
US 2022/0041298 A1     Feb. 10, 2022

(51) Int. Cl.
*B64D 45/08*      (2006.01)
*B64D 43/00*      (2006.01)

(52) U.S. Cl.
CPC ............ *B64D 45/08* (2013.01); *B64D 43/00* (2013.01)

(58) Field of Classification Search
CPC ........ B64D 43/00; B64D 45/00; B64D 45/08; F41H 11/02; G01C 23/00; G01C 23/005;
(Continued)

(56) References Cited

U.S. PATENT DOCUMENTS 3,066,889 A * 12/1962 Kelly .................... B64C 29/005
                                                                  244/12.3
4,368,517 A * 1/1983 Lovering ............. G01C 23/005
                                                                   340/972
(Continued)

OTHER PUBLICATIONS

3DLZ Helicopter Brownout Landing System 2014 Flight Test, H. N. Burns Engineering Corp., Accessed on Nov. 10, 2020, available at: <https://www.youtube.com/watch?v=tgoqaktpbFQ>.

*Primary Examiner* — Stephen R Burgdorf
(74) *Attorney, Agent, or Firm* — Patterson + Sheridan, LLP

(57) ABSTRACT

The present disclosure provides a landing assistance system that, in response to determining that an aircraft is within a deceleration and descent profile, displays a zero speed indicator that indicates a location where the aircraft is calculated to reach zero horizontal speed and zero altitude according to a reference glide path based on flight characteristics of the aircraft. The landing assistance system provides the symbols described herein by determining flight characteristics for an aircraft; calculating where to locate a zero speed indicator based on the flight characteristics; and projecting the zero speed indicator on a display in the aircraft. Low and high speed solutions, as well as azimuth dependent and azimuth independent solutions thereof, quickly and accurately provide the calculations based on the current flight characteristics of the aircraft to thereby provide pilots with landing aids that provide relevant landing information based, in part, on relative locations of the symbols.

19 Claims, 15 Drawing Sheets

(58) Field of Classification Search
CPC ...... G05D 1/0676; G05D 1/101; G05D 1/105; G05D 1/106; G08G 5/00; G08G 5/0008; G08G 5/0082; G08G 5/02; G08G 5/025; G08G 5/045
USPC .......................................................... 340/953
See application file for complete search history.

(56) References Cited

U.S. PATENT DOCUMENTS

| | | | |
|---|---|---|---|
| 8,774,989 B1 * | 7/2014 | Bush ...................... | B64D 43/02 |
| | | | 701/14 |
| 9,245,450 B1 * | 1/2016 | Chiew .................. | G08G 5/0047 |
| 2008/0012729 A1 * | 1/2008 | Constans ............... | G08G 5/025 |
| | | | 340/973 |
| 2009/0048724 A1 * | 2/2009 | Caule ................... | G08G 5/0021 |
| | | | 701/16 |
| 2014/0148980 A1 * | 5/2014 | Le Corre ............... | G08G 5/025 |
| | | | 701/16 |
| 2014/0257601 A1 * | 9/2014 | Horne ................... | G01C 23/005 |
| | | | 701/16 |
| 2015/0302753 A1 * | 10/2015 | Henderson ............. | G01C 23/00 |
| | | | 701/18 |
| 2016/0046386 A1 * | 2/2016 | Eberle .................. | G05D 1/0676 |
| | | | 701/7 |
| 2016/0110919 A1 * | 4/2016 | Hancock ............... | G06T 15/005 |
| | | | 345/428 |
| 2017/0301247 A1 * | 10/2017 | Sherry .................. | G06N 7/005 |

* cited by examiner

AIRCRAFT LANDING ASSISTANCE METHOD AND MEMORY STORAGE DEVICE INCLUDING INSTRUCTIONS FOR PERFORMING AN AIRCRAFT LANDING ASSISTANCE METHOD

STATEMENT OF GOVERNMENT INTEREST

This invention was made with government support under N00019-17-G-0002, DO N0001917F1011, CLIN 0010 awarded by the Department of Defense (DoD). The government has certain rights in the invention.

FIELD

Aspects of the present disclosure relate to navigational systems. More particularly, aspects relate to the navigational systems configured to aid an aircraft in setting up and performing landing maneuvers.

BACKGROUND

Vertical or Short Take Off and Landing (VSTOL) is a broad term that refers to the ability of an aircraft to take off or land with minimal or no need for a long runway. As used herein, VSTOL craft include helicopters, tiltrotor aircraft, powered lighter than air craft (e.g., rigid, semi-rigid, or non-rigid dirigibles and balloons), directed thrust jet craft, and the like. As a pilot of a VSTOL craft can have independent control of various speeds in different directions (e.g., separate vertical and horizontal speeds), landing such a craft can include a hover and descent phase (e.g., when final approach reaches zero horizontal speed before the pilot lowers the craft to the ground), and a repositioning phase (e.g., where the pilot reaches a designated altitude from the ground, but needs to move horizontally to the landing zone or select a new landing zone). Alternatively, when the VSTOL reaches the landing zone when the horizontal and vertical speeds reach zero at approximately at the same time, the pilot is said to have performed a zero-zero landing (e.g., zero forward speed and zero altitude).

However, quickly and accurately performing a zero-zero landing is a difficult technique for pilots to perform as the independent control of the horizontal and vertical speeds along with the horizontal distance can lead to landings that require multiple corrections to avoid landing short or long, with non-zero horizontal speed, or requiring a vertical descent with zero forward speed. Additional difficulties arise when selecting a new landing zone on the fly, such as when the originally planned landing zone is not clear or has otherwise become unsuitable since initial selection. Further, as several VSTOL aircraft operate in low visibility conditions when landing (e.g., kicking up dust from rotor downwash or operating in heavy fog, sandstorms, ash fall, etc.), the pilot can be deprived of visual information about the landing zone to adjust for a safe and fast landing.

SUMMARY

The present disclosure provides a method in one aspect, the method including: determining current flight characteristics for an aircraft via navigational sensors included in the aircraft; calculating where to locate a zero speed indicator on a display in the aircraft based on the current flight characteristics; and projecting the zero speed indicator on the display.

In one aspect, in combination with any example method above or below, the method further includes: projecting a landing zone indicator at a location on the display corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the current flight characteristics; and wherein projecting the zero speed indicator before the landing zone indicator in the direction of travel for the aircraft, indicates that the aircraft will reach zero forward speed in the direction of travel before the aircraft passes the coordinates according to the current flight characteristics.

In one aspect, in combination with any example method above or below, the zero speed indicator is displayed in response to determining that the aircraft is within a landing profile based on the current flight characteristics.

In one aspect, in combination with any example method above or below, the method further includes projecting a vertical deviation cue in the display in association with the zero speed indicator in response to determining that the aircraft is within a descent profile based on the current flight characteristics.

In one aspect, in combination with any example method above or below, the method further includes projecting a descent command indicator in the display in response to determining that the aircraft is within a descent profile based on the current flight characteristics; and wherein a color or pattern of the descent command indicator is based on whether the descent profile for the aircraft indicates that the aircraft will exceed a sink rate limit for the aircraft to achieve a zero-zero landing.

In one aspect, in combination with any example method above or below, calculating where to locate the zero speed indicator further includes: calculating a first target acceleration vector according to an azimuth dependent solution; calculating a second target acceleration vector according to an azimuth independent solution to accommodate those instances where the azimuth dependent solution does not converge upon a value for the first target acceleration vector; selecting one of the first target acceleration vector, the second target acceleration vector, or a combination of both the first target acceleration vector and the second target acceleration vector based upon the current flight characteristics of the aircraft; calculating first distances from a current location of the aircraft to achieve a target acceleration vector and second distances to account for variances in the first distances; calculating third distances from reaching the target acceleration vector to reaching a zero speed location; suppressing spikes in the third distances; and summing the first distances, second distances, and third distances to determine a total distance from the current location to the zero speed location, where the zero speed indicator is located.

In one aspect, in combination with any example method above or below, calculating where to locate the zero speed indicator further includes: estimating an initial value for a target acceleration vector; calculating times for the aircraft to achieve the target acceleration vector; calculating an initial value for a velocity vector that results from transitioning to the target acceleration vector; adjusting components of the velocity vector to account for variances in the times to achieve the target acceleration vector; and in response to an iteration count being below an iteration threshold and the target acceleration vector converging with the velocity vector, estimating a second value for the target acceleration vector to be evaluated during a next iteration.

The present disclosure provides an operation one aspect, the operation including: in response to determining that an aircraft is within a deceleration and descent profile, displaying a zero speed indicator that indicates a location where the aircraft is calculated to reach zero horizontal speed and zero altitude according to a reference glide path based on flight characteristics determined via navigational sensors included in the aircraft.

In one aspect, in combination with any example operation above or below, determining that the aircraft is within the deceleration and descent profile is based on a distance of the aircraft to a zero speed indicator and whether the aircraft is configured for landing.

In one aspect, in combination with any example operation above or below, the zero speed indicator is displayed relative to a map in an instrument panel that includes the location where the aircraft is to reach zero horizontal speed and zero altitude.

In one aspect, in combination with any example operation above or below, the zero speed indicator is displayed relative to a field of view in a heads up display that includes the location where the aircraft is to reach zero horizontal speed and zero vertical speed; and wherein display of the location where the aircraft is to reach zero horizontal speed is geo-correlated and conformal to a view outside of the aircraft.

In one aspect, in combination with any example operation above or below, the operation further includes: displaying a landing zone indicator at a second location corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the flight characteristics; and wherein projecting the zero speed indicator before the landing zone indicator in the direction of travel for the aircraft indicates that the aircraft will reach zero forward speed in the direction of travel before the aircraft passes the coordinates according to the flight characteristics.

In one aspect, in combination with any example operation above or below, the location where the aircraft is calculated to reach zero horizontal speed is calculated by: calculating a first distance from a current location of the aircraft to a first location where the aircraft reaches a target acceleration vector; calculating a second distance from the first location to a second location where the aircraft reaches zero speed by decelerating according to the target acceleration vector; and summing the first distance and the second distance to determine a total distance from the current location to a zero speed location, where the zero speed indicator is located.

In one aspect, in combination with any example operation above or below, determining that the aircraft is within the descent profile includes: determining that a forward speed of the aircraft is below a speed and deceleration threshold for terminal guidance; and determining that at least one of a propeller nacelle, thrust vectoring system, or propulsor of the aircraft is rotated to a down-thrust position from a back-thrust position and landing gear is deployed.

The present disclosure provides a memory storage device including instructions that are executable by a processor perform an operation one aspect, the operation including: determining current flight characteristics for an aircraft via navigational sensors included in the aircraft; calculating where to locate a zero speed indicator on a display in the aircraft based on the current flight characteristics; and projecting the zero speed indicator on the display.

In one aspect, in combination with any example memory storage device above or below, the operation further includes: projecting a landing zone indicator at a location on the display corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the current flight characteristics; and wherein projecting the zero speed indicator before the landing zone indicator in the direction of travel for the aircraft indicates that the aircraft will reach zero forward speed in the direction of travel before the aircraft passes the coordinates according to the current flight characteristics.

In one aspect, in combination with any example memory storage device above or below, the operation further includes in response to determining that the aircraft is within a descent profile based on the current flight characteristics: projecting a vertical deviation cue in the display in association with the zero speed indicator; and projecting a descent command indicator in the display, wherein a color or pattern of the descent command indicator is based on whether the descent profile for the aircraft indicates that the aircraft will exceed a sink rate limit for the aircraft to achieve a zero-zero landing.

In one aspect, in combination with any example memory storage device above or below, the zero speed indicator is displayed relative to a map in an instrument panel that includes a location where the aircraft is to reach zero horizontal speed and zero altitude.

In one aspect, in combination with any example memory storage device above or below, calculating where to locate the zero speed indicator further includes: determining a limit for current aircraft acceleration; calculating a first target acceleration vector based on the limit for current aircraft acceleration and according to an azimuth dependent solution; calculating a second target acceleration vector based on the limit for current aircraft acceleration and according to an azimuth independent solution to accommodate those instances where the azimuth dependent solution does not converge upon a value for the first target acceleration vector; and selecting one of the first target acceleration vector, the second target acceleration vector, or a combination of both the first target acceleration vector and the second target acceleration vector based upon the current flight characteristics of the aircraft.

In one aspect, in combination with any example memory storage device above or below, the memory storage device is included in the aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
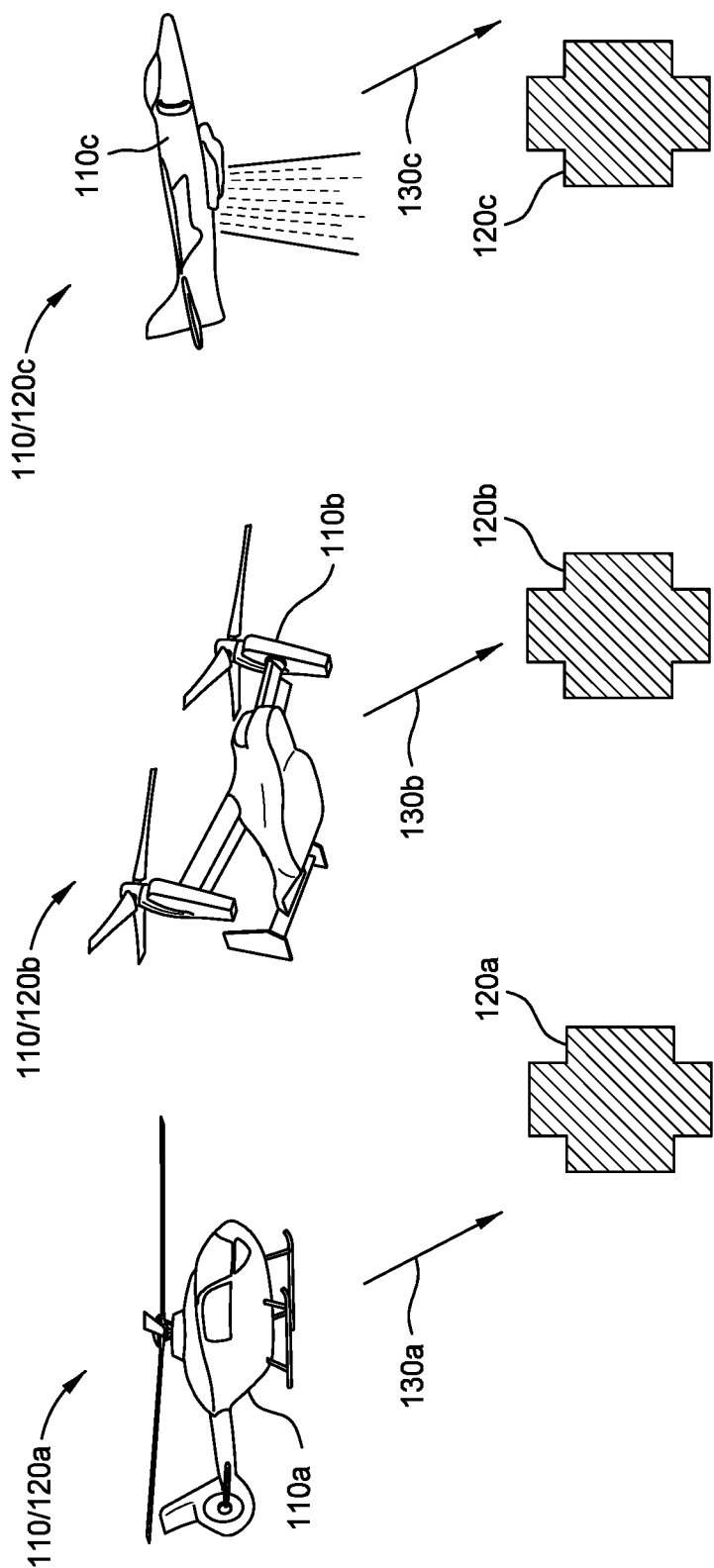
FIG. 1 illustrates a series of various aircraft attempting to land at corresponding landing zones, according to aspects of the present disclosure.

The present disclosure provides real-time guidance to pilots of VSTOL aircraft engaged in or preparing for landing operations. In a VSTOL aircraft, attaining a zero-zero landing (in which horizontal speed and altitude reach zero at substantially the same time when reaching a landing zone), often provides the fastest and safest landing for the aircraft, the passengers, and crew as wear on the engine, thrust requirements, and time in an operational area are reduced. Similarly, by accurately performing a zero-zero landing in a designated landing zone, the ability to coordinate multiple landings or takeoffs for several aircraft is improved, improving the ability to quickly deliver supplies or aid.

For example, when a first helicopter and a second helicopter are delivering firefighters to a wildfire, having greater control over the timing and positioning of when and where each of the helicopters lands can provide for a faster arrival, unloading, and departure cycle of the individual helicopters. Accordingly, the first and second helicopter can use the same landing zone sequentially with less delay between landings or can safely use adjacent landing zones simultaneously with greater precision (e.g., smaller margins of where each craft lands). The greater speed and precision allows the helicopters not only to deliver the personnel to the mission faster, but to spend less time operating in an environment detrimental to the aircraft (e.g., reducing ash intake to the engines, reducing fuel usage, etc.) among other benefits.

The present disclosure provides a visual landing system configured to display graphical user interface elements (e.g., specialized symbols) to pilots to enable faster and more precise zero-zero landings. The visual landing system described herein may be configured to use existing sensor data and display hardware, thus requiring no additions to the electronics or sensor packages of the aircraft. However, the visual landing systems described herein may also use new sensors to augment existing sensors and sensor data, thus allowing the visual landing systems to be integrated into a wide variety of aircraft and display hardware including Heads Up Displays (HUDs). Beneficially, the landing symbols generated by the visual landing system are calculated and displayed in such a way as to allow the pilots to quickly update where the aircraft will land and perform a zero-zero landing at that location.

Unless otherwise stated, the horizontal speeds and accelerations discussed herein are referenced to the aircraft x and y shadow axes. In shadow axes, the x-y plane is parallel to the surface of the Earth, and the x axis is the shadow of the aircraft longitudinal axis upon that plane. The positive sense of the x axis is forward, i.e. out the nose of the aircraft, and the positive sense of the y axis is to the right when facing forward, i.e. out the right wing. Vertical speed and acceleration are referenced to the aircraft z shadow axis, which is perpendicular to the surface of the Earth; the positive sense of the z axis is down or toward the Earth, however for the purpose of the pilot the z axis is displayed as positive up.

FIG. 1 illustrates a series of VSTOL aircraft 110a-c (generally, aircraft 110) attempting to land at corresponding landing zones 120a-c (generally, landing zone 120), according to aspects of the present disclosure. The corresponding glide paths 130a-c (generally, glide path 130) for each of the aircraft 110a-c is shown, illustrating the trajectory that the aircraft 110a-c is following relative to the corresponding landing zone 120a-c.

The first aircraft 110a is a helicopter that has a first glide path 130a with a speed of descent too fast relative to the horizontal speed (and deceleration rate thereof) to perform a zero-zero landing at the first landing zone 120a. Accordingly, if the pilot of the first aircraft 110a does not adjust the vertical or horizontal speed (or rate of acceleration thereof), or select a new landing zone, the first aircraft 110a will undershoot the first landing zone 120a or have to perform various hover and repositioning phases to align the first aircraft 110a with the first landing zone 120a. As will be appreciated, acceleration in a given direction can be positive (e.g., increasing the velocity in the given direction) or negative (e.g., decreasing the velocity in the given direction).

The second aircraft 110b is a tiltrotor aircraft that has a second glide path 130b with a speed of descent and a horizontal deceleration matched to perform a zero-zero landing at the second landing zone 120b. Assuming the pilot does not update the second landing zone 120b or the speed/deceleration of the second aircraft 110b, the second aircraft 110b will perform a zero-zero landing in the second landing zone 120b.

The third aircraft 110c is a vectored thrust aircraft that has a third glide path 130c with a speed of descent too slow relative to the horizontal speed (and deceleration rate thereof) to perform a zero-zero landing at the third landing zone 120c. Accordingly, if the pilot of the third aircraft 110c does not adjust the vertical or horizontal speed (or rate of acceleration thereof), or select a new landing zone, the third aircraft 110c will overshoot the third landing zone 120c or have to perform various hover and repositioning phases to align the third aircraft 110c with the third landing zone 120c.

Figure 2:
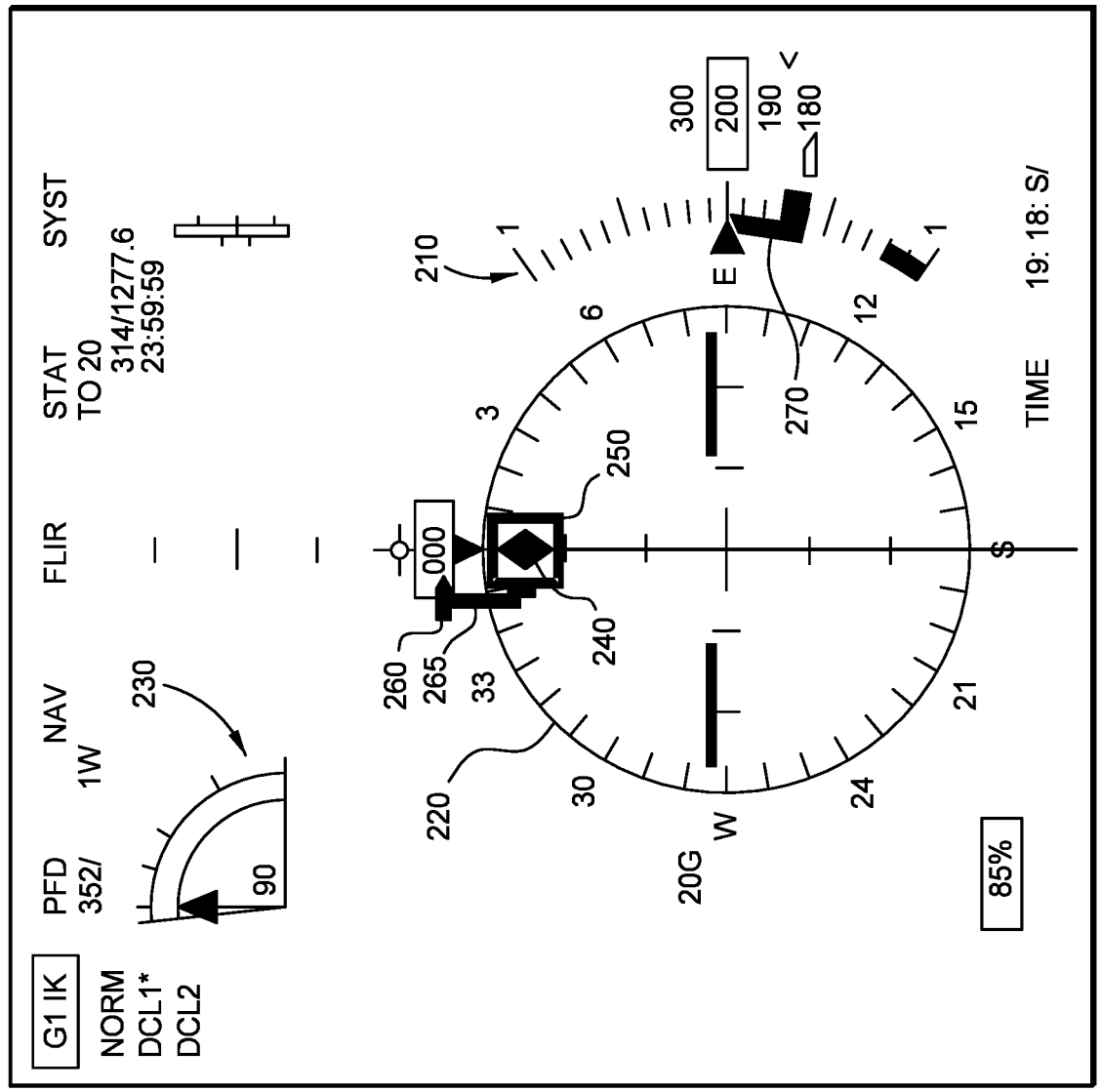
FIG. 2 illustrates a cockpit display including symbology for aiding a pilot to land, according to aspects of the present disclosure.

FIG. 2 illustrates a display 200 including symbology for aiding a pilot to land, according to aspects of the present disclosure. The display 200 provides several elements to the pilot (or co-pilot, navigator, or other crew member) that indicate flight characteristics of the aircraft and landing performance.

Some of the elements in the display 200 represent flight characteristics via relative or absolute values based off of sensor readings collected by the aircraft (e.g., from a compass, a Global Positioning System (GPS) receiver, a gyroscope, an inertial navigation system (INS) (e.g., a six degrees of freedom (6DoF) system), a range finder, etc.). For example, a vertical velocity indicator 210 displays the vertical speed of the aircraft, a heading indicator 220 indicates the heading of the aircraft (e.g., where the aircraft is headed in a north vs. east mapping), and a nacelle angle indicator 230 indicates the angle of tilt of the tiltrotor aircraft's nacelles.

Other elements in the display 200 represent calculated or predicted values to aid the pilot's understanding of the glide path of the aircraft to a selected landing zone. For example, a landing zone indicator 240 indicates a selected or predefined landing zone that the aircraft is to land at. In some aspects, the landing zone indicator 240 is positioned in the display based on GPS coordinates relative to a map or satellite view of the environment.

Figure 3A:
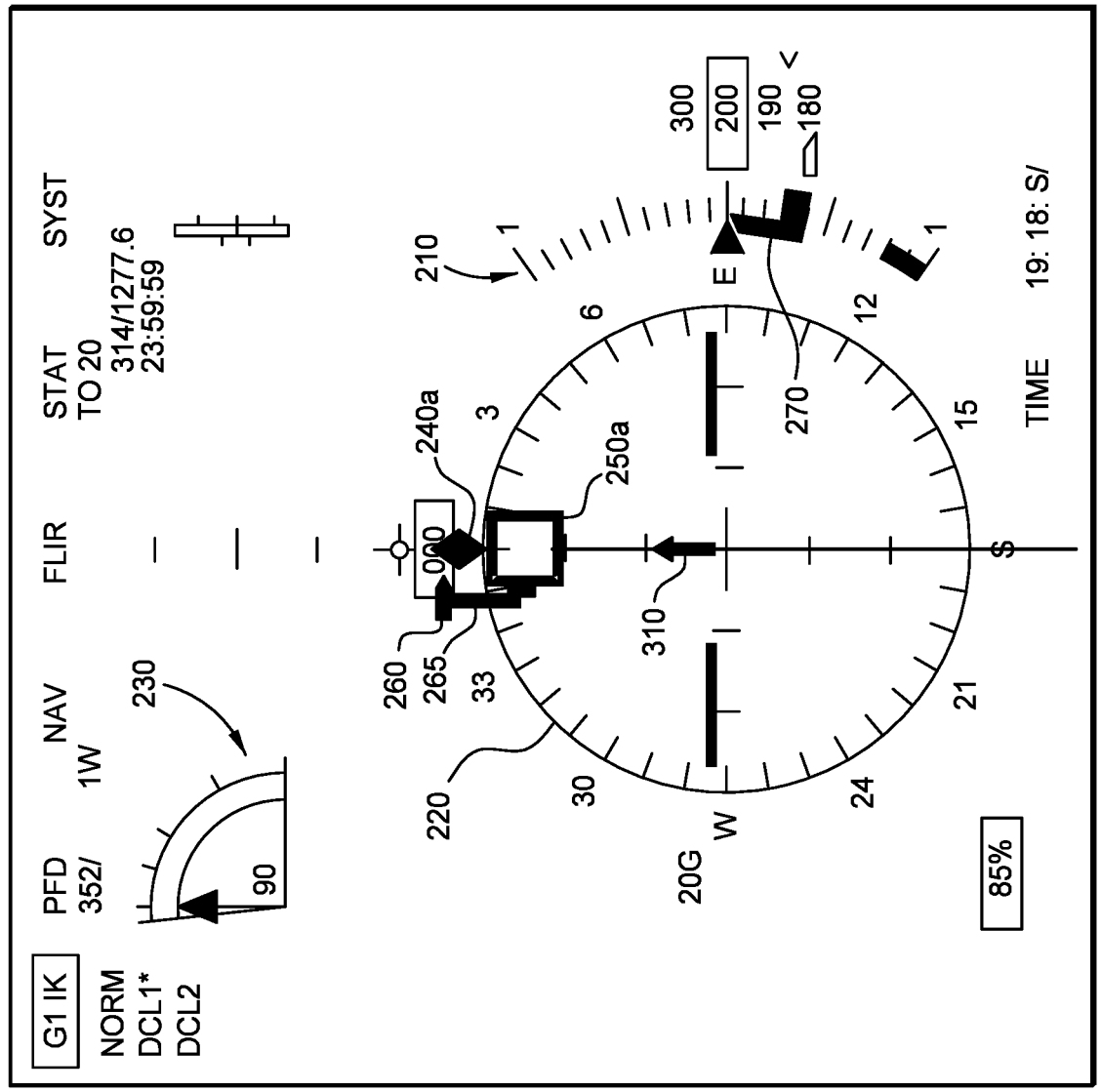
FIGS. 3A-3C illustrate various relative positions of the landing zone indicator or waypoint and the zero speed indicator and the data that the various relative positions communicate to a pilot, according to aspects of the present disclosure.
Figure 3B:
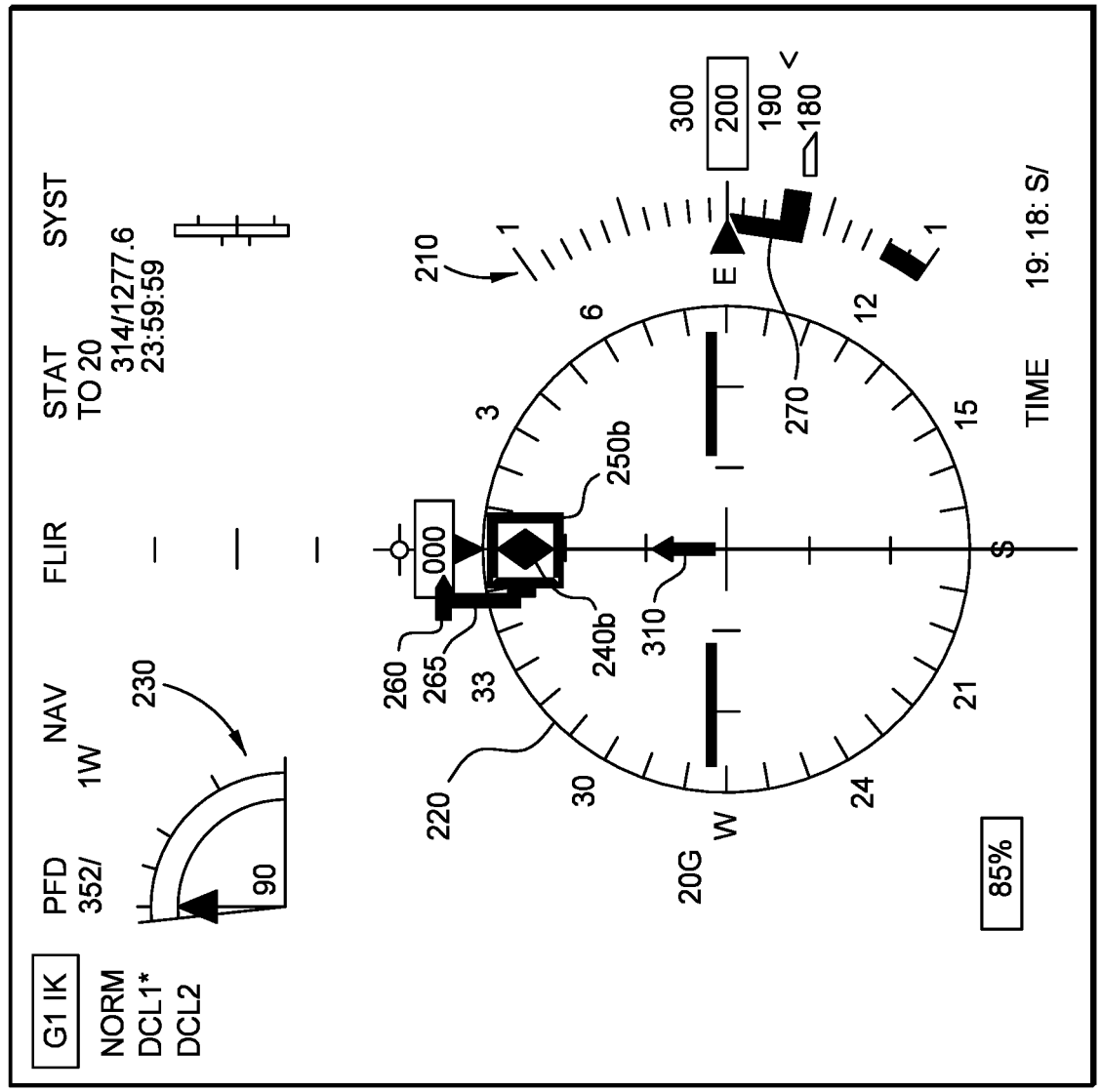
Figure 3C:
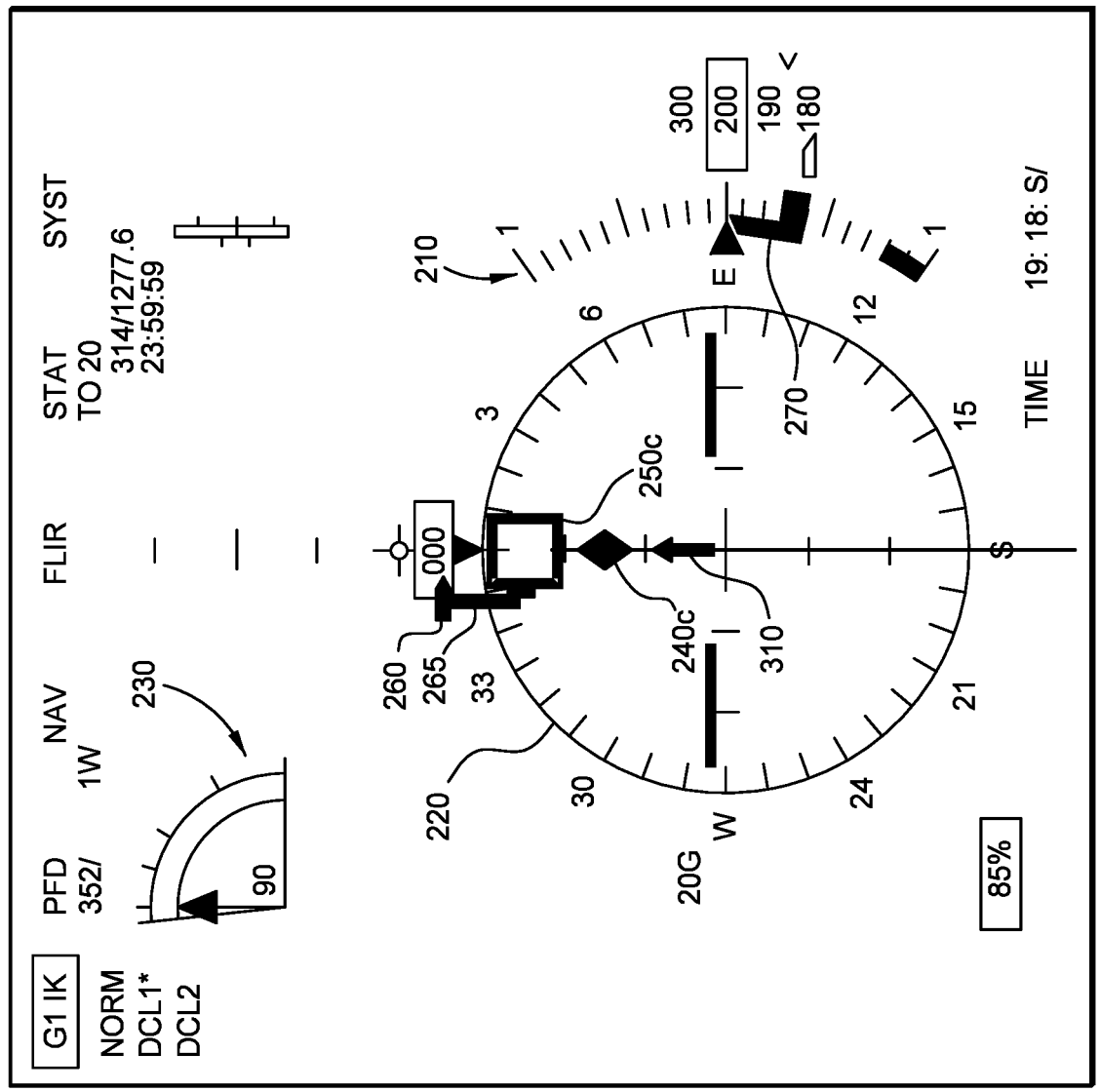

In another example, and as is shown in greater detail in regard to FIGS. 3A-3C, a zero speed indicator 250 is shown in the display 200. The zero speed indicator 250 projects onto an image (e.g., a map), viewport, or geo-correlated HUD with a field of view of the location where the flightpath for the aircraft is calculated to reach zero forward speed based on the current velocities and accelerations (e.g., northward/southward and eastward/westward). The zero speed indicator 250 is not a displayed velocity vector of zero, but rather is a calculated location or set of coordinates where the velocity vectors for the aircraft are predicted to reach zero. When the pilot adjusts the speed and acceleration of the aircraft, the position of the zero speed indicator 250 changes to reflect the new location where the aircraft is predicted to reach a zero forward speed. Accordingly, a pilot can align the zero speed indicator 250 with the landing zone indicator 240 to perform a zero-zero landing at the selected or predefined landing zone. Additionally or alternatively, the pilot can align the zero speed indicator 250 with a landing zone indicator visible through a HUD or with a feature on a map or satellite image that the display 200 overlays to thereby select an alternative landing zone. In the case of a geo-correlated/head tracked HUD, the zero speed indicator 250 may be aligned with a visibly identified ground marking or feature, or be used to avoid obstacles in a landing zone (such as fence posts, vehicles, etc.).

Figure 4A:
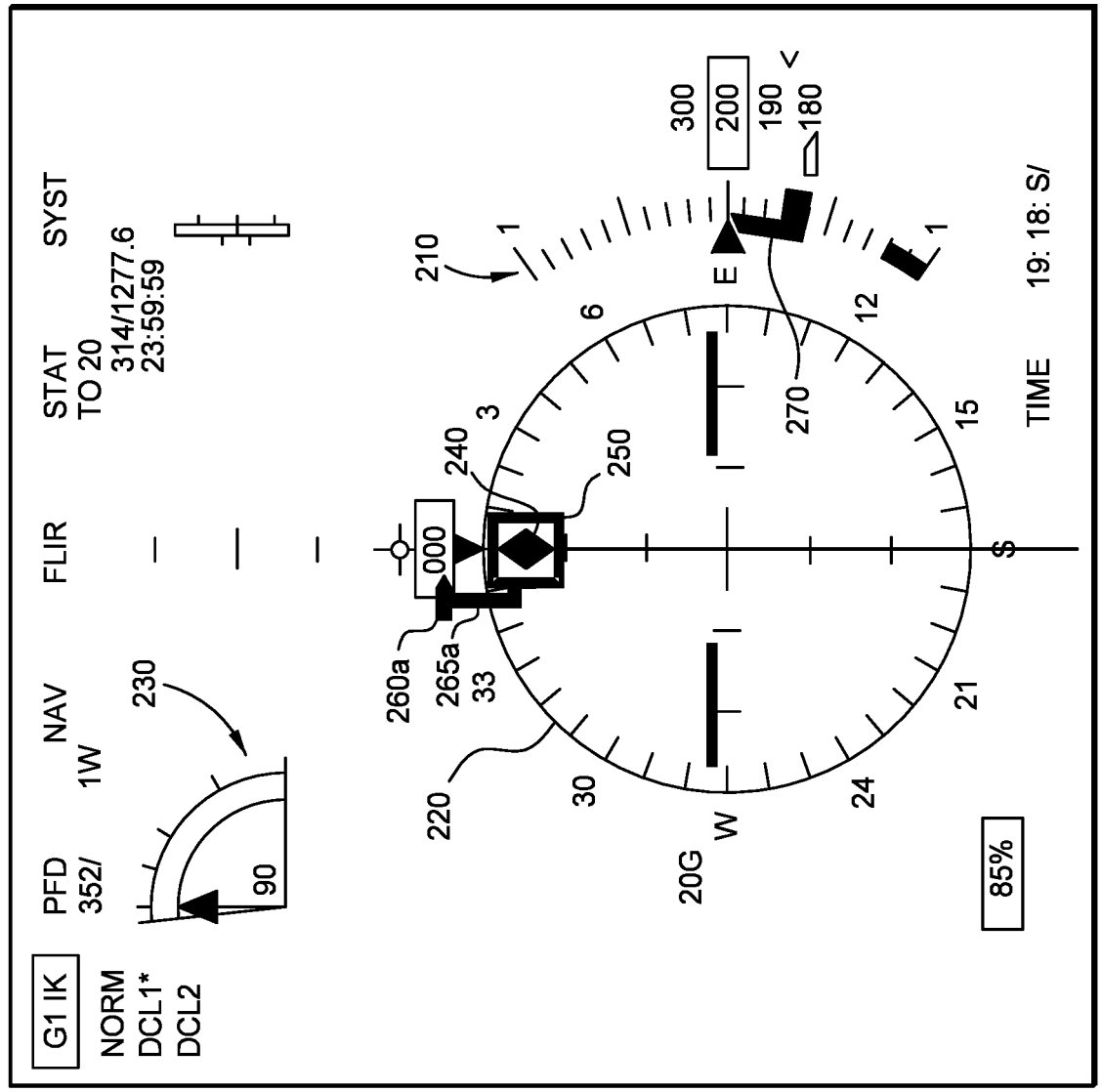
FIGS. 4A-4C illustrate various relative positions of a vertical deviation cue, the zero speed indicator, and the data that the various relative positions communicate to a pilot, according to aspects of the present disclosure.
Figure 4B:
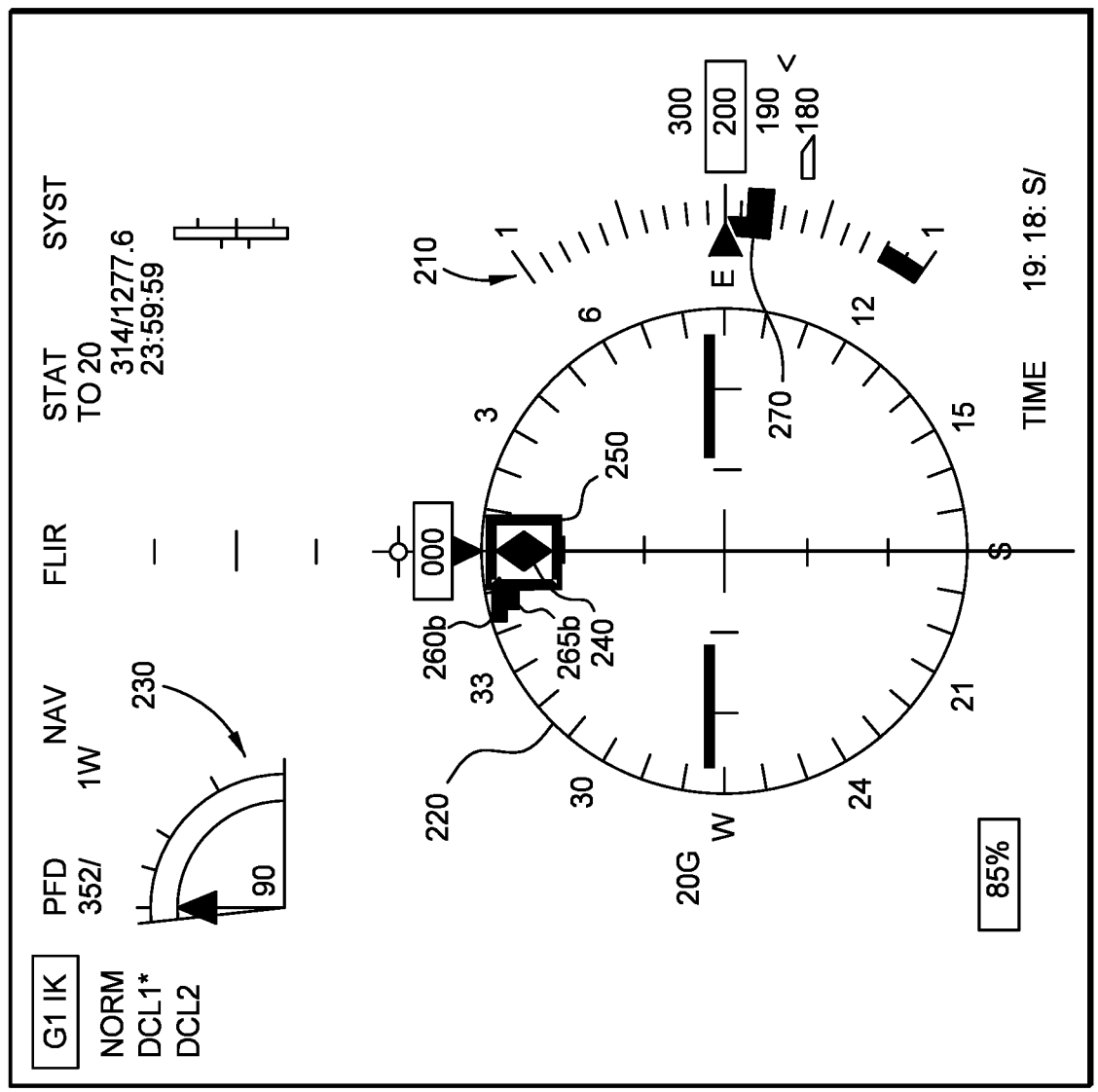
Figure 4C:
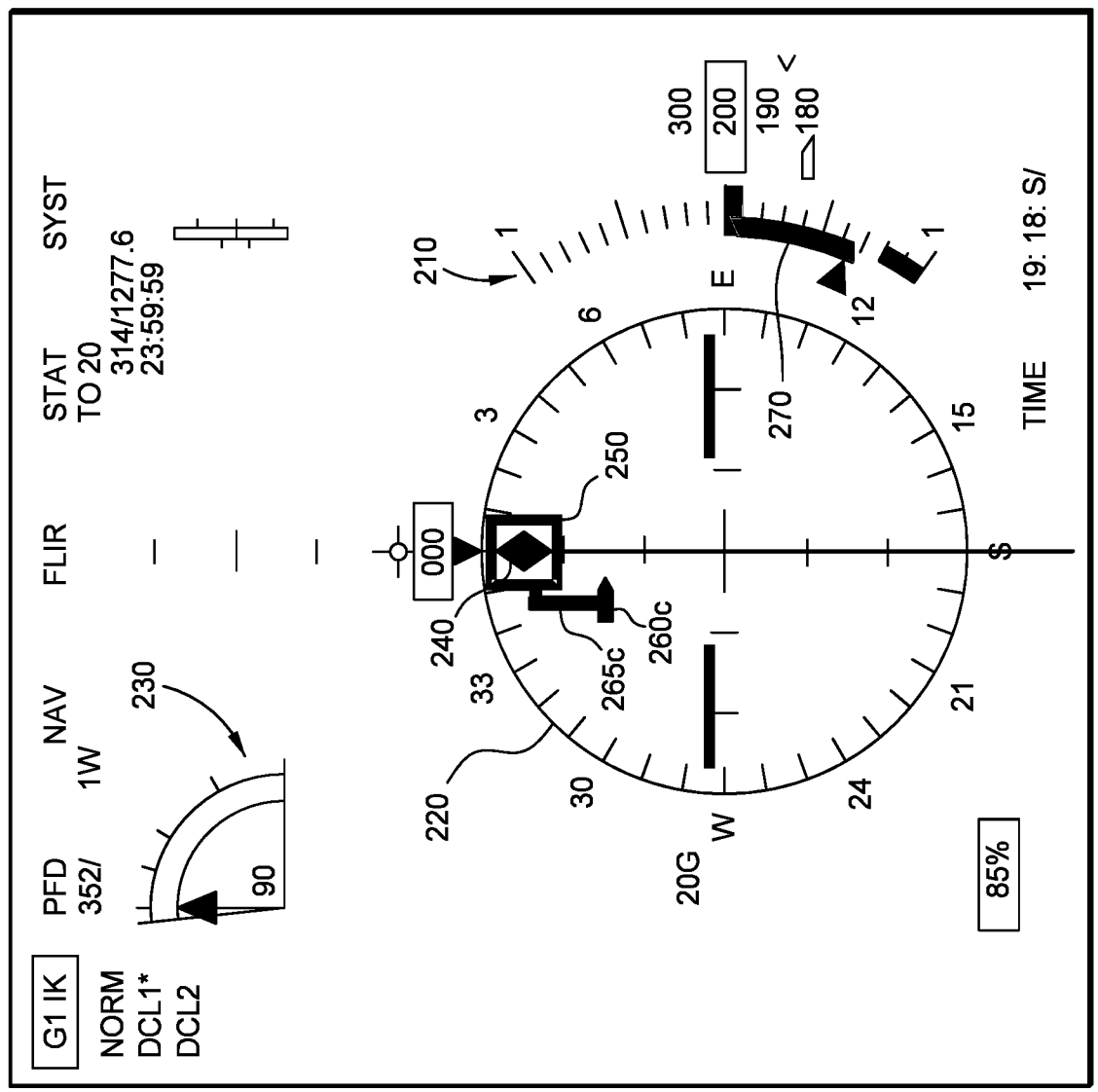

In a further example, and as is shown in greater detail in regard to FIGS. 4A-4C, a vertical deviation cue 260 (optionally including a reference line 265) is shown in conjunction with the zero speed indicator 250 in the display 200. The vertical deviation cue 260 provides additional information to the pilot related to the current vertical speed and acceleration of the aircraft that is required for the aircraft to reach the ground and therefore land at the location where the aircraft is predicted to reach zero forward speed. The vertical deviation cue 260 shows a difference above or below the current vertical speed required. The reference line 265 is provided in some aspects to visually link the vertical deviation cue 260 and the zero speed indicator 250.

Figure 5C:
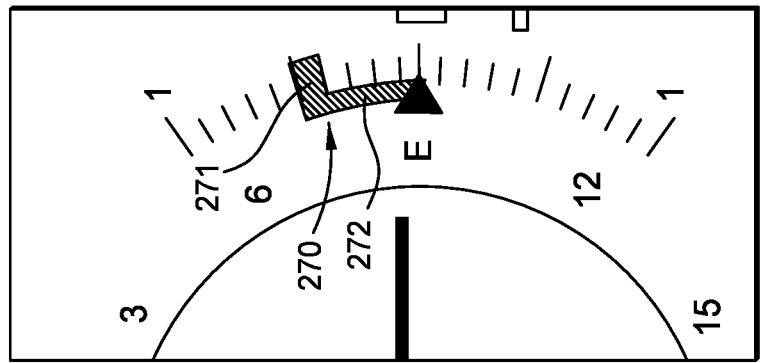
FIGS. 5A-5C illustrate various relative positions of a descent command indicator and the data that the various relative positions communicate to a pilot, according to aspects of the present disclosure.
Figure 5B:
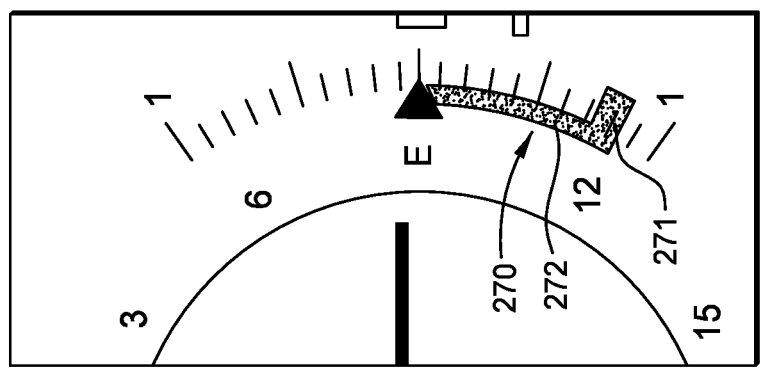
Figure 5A:
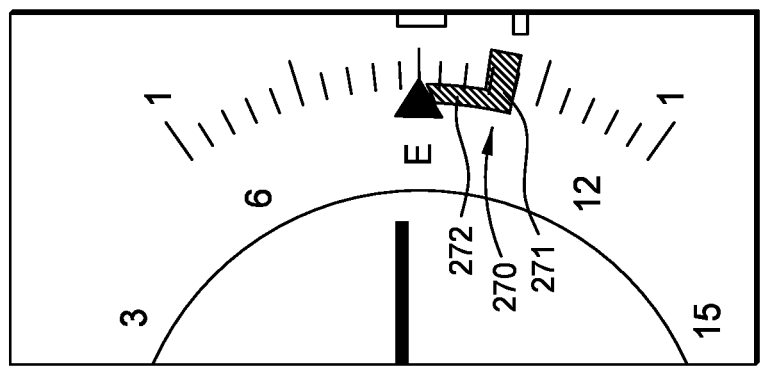

In an additional example, and as is shown in greater detail in regard to FIGS. 5A-5C, a descent command indicator 270 is shown in the display 200. The descent command indicator 270 includes a Rate of Descent (ROD) command indicator 271 that shows the ROD for the aircraft to be followed by the pilot (e.g., descend X meters per second) and a drag line 272, which indicates a deviation between the current vertical speed and the ROD command needed to simultaneously achieve a zero-zero landing (e.g., zero forward speed and zero vertical speed). In various aspects, the descent command indicator 270 is calculated based on the projected location of the zero speed indicator 250, similarly to the vertical deviation cue 260.

FIGS. 3A-3C illustrate various relative positions of the landing zone indicator 240 and the zero speed indicator 250 and the data that the various relative positions communicate to a pilot, according to aspects of the present disclosure. FIGS. 3A-3C illustrate respective landing zone indicators 240a-c and zero speed indicators 250a-c independently of the other elements that can be included in a display (e.g., the display 200 of FIG. 2).

FIG. 3A illustrates a first landing zone indicator 240a located after a first zero speed indicator 250a in a direction 310 of travel. The relative positions shown in FIG. 3A indicate that the aircraft will reach zero forward speed (in the direction 310 of travel) before the aircraft passes the landing zone associated with the first landing zone indicator 240a. Accordingly, to perform a zero-zero landing at the designated landing zone, the pilot should increase speed in direction 310 of travel (e.g., by accelerating or reducing negative acceleration).

FIG. 3B illustrates a second landing zone indicator 240b located within a second zero speed indicator 250b in a direction 310 of travel. The relative positions shown in FIG. 3B indicate that the aircraft will reach zero forward speed (in the direction 310 of travel) when the aircraft reaches the landing zone associated with the second landing zone indicator 240b.

FIG. 3C illustrates a third landing zone indicator 240c located before a third zero speed indicator 250c in a direction 310 of travel. The relative positions shown in FIG. 3C indicate that the aircraft will reach zero forward speed (in the direction 310 of travel) after the aircraft passes the landing zone associated with the third landing zone indicator 240c. Accordingly, to perform a zero-zero landing at the designated landing zone, the pilot should reduce speed in direction 310 of travel (e.g., by decelerating or reducing positive acceleration).

In some aspects, the pilot intentionally selects a different landing zone than the predefined landing zone indicated by the respective landing zone indicator 240a-c. Accordingly, the pilot can align the glide path of the aircraft to the user-selected landing zone based on the relative location of the zero speed indicator 250 to a landmark or other identifying feature on a map or visual overlay that the zero speed indicator 250 is displayed above in addition to or instead of a landing zone indicator 240. The pilot can therefore use the relative position of the zero speed indicator 250 to perform a zero-zero landing, as is generally described above with reference to the landing zone indicators 240a-c, based on a relative location of a landmark or other feature chosen for a new landing zone. This adjustment can be done without having to re-designate or key in a new landing zone to the computer/flight management system.

The pilot can modulate the acceleration and deceleration of the aircraft to maintain or reposition the zero speed indicator 250 relative to the landing zone indicator 240, a waypoint, or alternate position to adjust the approach of the aircraft during descent and landing.

Although illustrated in FIGS. 3A-3C as a diamond, in various different aspects, the landing zone indicators 240 can be represented by different shapes and in various colors. For example, a primary landing zone and a secondary landing zone can be displayed at the same time with different shapes selected for each landing zone. In another example, when an approach path is restricted (e.g., due to nearby buildings, trees, other aircraft, weather conditions, etc.), the landing zone indicator 240 may be recolored or reshaped to indicate various hazards.

Similarly, although illustrated in FIGS. 3A-3C as a hollow square, in various different aspects, different shapes and colors can be used for the landing symbology, which can be sized or shaped based on the physical characteristics of the aircraft and the size of the landing zone required by the aircraft.

FIGS. 4A-4C illustrate various relative positions of a vertical deviation cue 260, the zero speed indicator 250, and the data that the various relative positions communicate to a pilot, according to aspects of the present disclosure.

FIGS. 4A-4C illustrate respective vertical deviation cues 260a-c and zero speed indicators 250a-c independently of the other elements that can be included in a display (e.g., the display 200 of FIG. 2). The vertical deviation cue 260 provides a secondary indication of the difference between the current vertical speed and the ROD command, and is displayed next to the zero speed indicator 250 to provide additional situational awareness to the pilot (e.g., reducing eye movement to read other readouts by providing a compact display of related information).

In the depicted aspect, the relative location of the vertical deviation cue 260 to the zero speed indicator 250 is proportional to the required change in vertical speed to reach the ground (zero altitude) and land at the location of the zero speed indicator 250. Greater difference from a centered position indicates that a greater change in vertical speed is required to reach the ground at the location of the zero speed indicator 250. When the vertical deviation exceeds a display threshold, a reference line 265 is displayed to link the vertical deviation cue 260 and the zero speed indicator 250, and the length of the reference line 265 corresponds to the required change in vertical speed.

Because the vertical deviation cue 260 does not indicate actual vertical speed nor the rate of descent command, but rather the required change in vertical speed, the size of the reference line 265 (and thereby the combined element of the vertical deviation cue 260, and reference line 265) and the deflection of the reference line 265 (and the size of the combined element) are generally minimized. By minimizing the overall size of the combined element, the pilot is provided with less clutter in the display, and more access to underlying data (e.g., map elements) that would otherwise be obscured by the overlay of a larger display element. Accordingly, the landing symbology described in the present disclosure provide an improved user interface that delimit the type of data to be displayed and how to display those data to thereby increase the efficiency of using the displays with limited screen space to convey information.

FIG. 4A illustrates a first vertical cue 260a that is shown "above" the first zero speed indicator 250a, which indicates that the vertical speed or altitude is too high to achieve a zero-zero landing and that the pilot should decrease the vertical speed of the aircraft (e.g., descend faster or climb slower). Additionally, based on the operational profile of the aircraft, the first vertical cue 260a may be capped by a sink rate limit (e.g., to encourage the pilot to descend no faster than the recommended maximum sink rate) so that the pilot does not descend into rotor wash, stall the aircraft, or otherwise descend faster than is advisable.

FIG. 4B illustrates a second vertical cue 260b that is shown "on profile" or centered on the second zero speed indicator 250b, which indicates that the vertical speed is within a range threshold for performing a zero-zero landing. Accordingly, the pilot should maintain the current vertical speed if the second zero speed indicator 250b is aligned with a desired landing zone.

FIG. 4C illustrates a third vertical cue 260c that is shown "below" the third zero speed indicator 250c, which indicates that the vertical speed is too low to achieve a zero-zero landing and that the pilot should increase the vertical speed of the aircraft (e.g., climb faster or descend slower), otherwise the aircraft will land short of intended zone with non-zero forward speed.

As will be appreciated, in various aspects, the vertical offset of the vertical deviation cue 260 can be reversed from that described in relation to FIGS. 4A and 4C (i.e., swapping which of "above" (per FIG. 4A) and "below" (per FIG. 4C) to indicate that the pilot should reduce or increase vertical speed).

FIGS. 5A-5C illustrate various relative positions of a descent command indicator 270 and the data that the various relative positions communicate to a pilot, according to aspects of the present disclosure.

The descent command indicator 270 includes a ROD command indicator 271 that shows a commanded or specified ROD for the aircraft and a drag line 272, which extends from the measured vertical speed to the ROD command indicator 271. The ROD command indicator 271 shows the vertical speed that the aircraft should be at to reach the ground at the same time zero forward speed is achieved. The relative position of the ROD command indicator 271 to the current vertical speed indicates how large of a change in vertical speed the pilot needs to make to achieve a zero-zero landing, and the relative direction of descent command indicator 270 to the current vertical speed indicates whether the pilot should increase or decrease the current vertical speed.

FIG. 5A shows a first descent command indicator 270a when the aircraft is above profile, indicating that the pilot should increase the ROD (i.e., descend faster or climb slower).

FIG. 5B shows a second descent command indicator 270b when the aircraft is above profile, but the change in ROD to put the aircraft back on profile to achieve a zero-zero landing would put the aircraft below a vertical speed associated with a sink rate limit so that the pilot does not descend into rotor wash, stall the aircraft, or otherwise descend faster than is advisable for the aircraft. The second descent command indicator 270b is therefore shown in FIG. 5B with a different coloration or pattern than the first descent command indicator 270a shown in FIG. 5A to communicate the sink rate warning to the pilot. As will be appreciated, the sink rate limit may include a buffer or tolerance value to trigger the change in color or pattern in a descent command indicator 270 when the identified vertical speed to achieve a zero-zero landing approaches the recommended maximum sink rate for the aircraft.

FIG. 5C shows a third descent command indicator 270c when the aircraft is below profile, indicating that the pilot should decrease the ROD (i.e., descend slower or climb faster).

Figure 6:
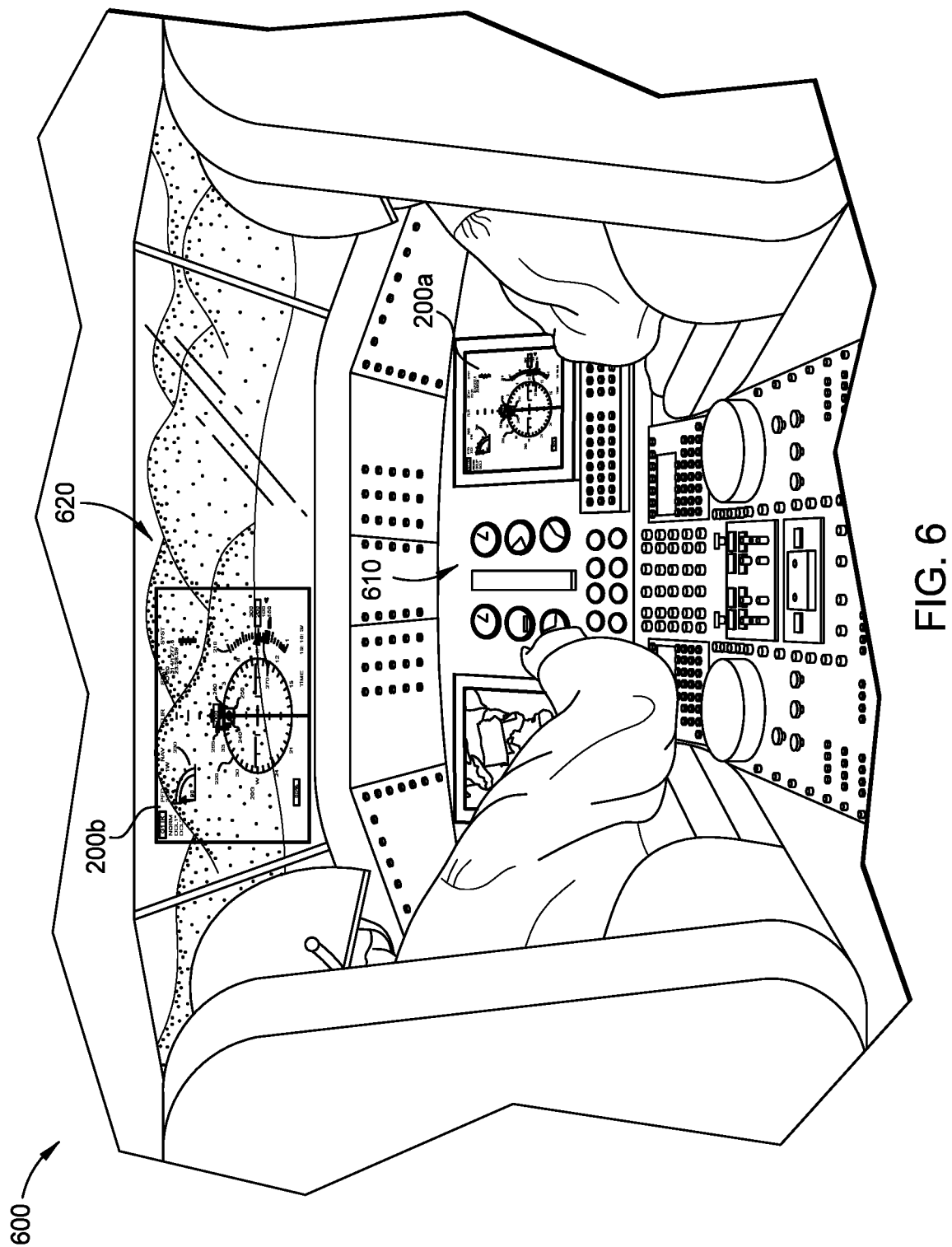
FIG. 6 illustrates aspects of a cockpit of an aircraft, according to aspects of the present disclosure.

FIG. 6 illustrates aspects of a cockpit 600 of an aircraft in which the display 200 discussed in FIGS. 2, 3A-3C, 4A-4C, and 5A-5C is provided to the crew, according to aspects of the present disclosure. Multiple instances of the display 200 can be provided in different locations within the cockpit 600. For example, a first display 200a is provided in an instrument panel 610 and a second display 200b is provided in a HUD 620. Furthermore, HUDS may either be independent of aircraft orientation and pilot view or be geo-correlated (or conformal) so that the pilot can overlay the symbology on real world visually identified features/markings.

In various aspects, the instrument panel 610 includes various physical and digital gauges as well as control interfaces (e.g., joysticks, switches, knobs, buttons, etc.) to control flight and navigation of the aircraft.

In various aspects, the HUD 620 can be displayed on a cockpit or windshield of the aircraft, an intermediary transparent or semi-transparent display (between the pilot and the cockpit/windshield, including films placed on the cockpit/windshield), or a personal display surface for the pilot (e.g., on visors, glasses, monocles, night vision goggles, or other personal eyewear).

In various aspects, each instance of the display 200 can be identical, or may show or omit different elements or show elements in different locations from one another. For example, the first display 200a in the instrument panel 610 can display a map element underneath the other elements of the first display 200a, whereas the HUD 620 omits a map element, and is instead aligned with a field of view of the pilot (or other crew member) with the environment. In another example, the second display 200b in the HUD 620 can show the nacelle angle indicator 230 in the top left corner of the second display 200b while the first display 200a in the instrument panel 610 omits the nacelle angle indicator 230 or shows the nacelle angle indicator 230 in the bottom right corner of the first display 200a.

Figure 7:
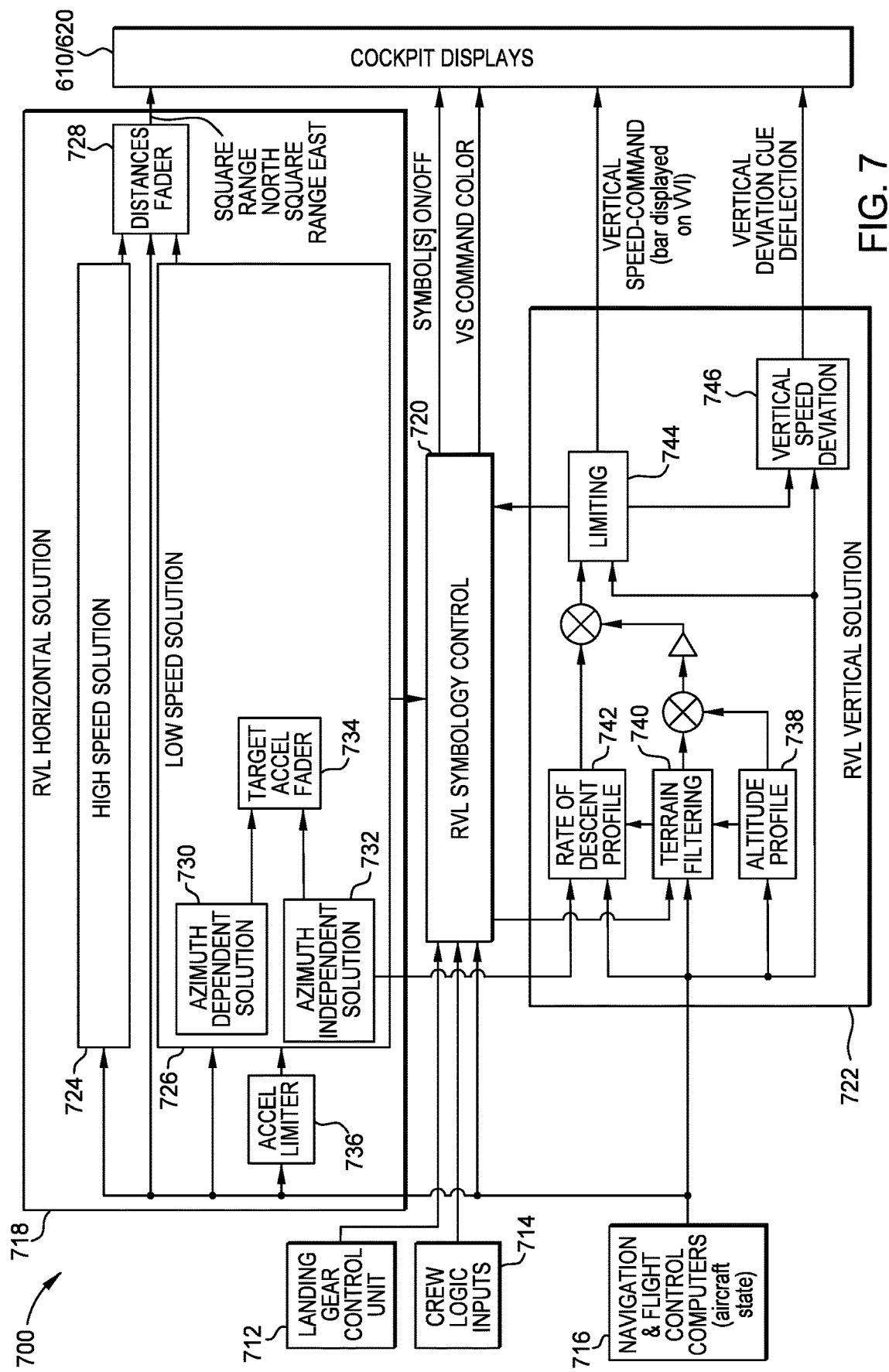
FIG. 7 illustrates an architecture for providing landing symbology, according to aspects of the present disclosure.

FIG. 7 illustrates an architecture 700 for providing landing symbology, according to aspects of the present disclosure. The architecture 700 can be implemented in one or more computing devices (such as those illustrated in relation to FIG. 11), Systems On a Chip (SoC), Application Specific Integrated Circuits (ASIC), or other general or specific computing systems that are included in the aircraft or otherwise in communication with the aircraft. As will be appreciated, aircraft often include backup or redundant systems and several instances of various systems, therefore although FIG. 7 illustrates a given number of various components of the architecture 700, each of the components is illustrative of one or several instances of each component.

The architecture 700 receives input data from a landing gear control unit 712, crew logic inputs 714 (e.g., from commands issued via a control panel or interface in the instrument panel), and the navigation and flight control computers 716 for the aircraft. The landing gear control unit 712 provides data related to the status of the landing gear (e.g., extended or retracted for aircraft with retractable landing gear). The crew logic inputs 714 include data related to inputs received from the crew, such as, for example, whether to call or dismiss display of various HUD or instrument panel displays, etc.

The input data from the navigation and flight control computers 716 include various flight characteristic data for the aircraft, the thrust direction (e.g. nacelle tilt status of a tiltrotor aircraft or jet ducting angle for ducted jet aircraft to generate down thrust rather than back thrust), current altitude from sea level, current distance from the ground, horizontal tilt of the aircraft (e.g., pitch or roll), vertical speed and acceleration of the aircraft, horizontal (in the North/East directions) speed and acceleration of the aircraft. In various aspects, the flight characteristic data are collected from navigational sensors included in the aircraft including a compass, a Global Positioning System (GPS) receiver, a downward facing radar altimeter, a gyroscope, INS, among other navigational sensors.

The input data are used by a horizontal solution module 718, a symbology control module 720, and a vertical solution module 722 to determine whether and where to display various landing symbols (e.g., the landing zone indicator (waypoint) 240, zero speed indicator 250, descent command indicator 270, and vertical deviation cue 260, as per FIG. 2) in one or more cockpit displays (e.g., the instrument panel 610 or a HUD 620 as per FIG. 6).

The horizontal solution module 718 determines how to display the zero speed indicator based on the flight characteristic data received from the navigational and flight control computers 716. The horizontal solution module 718 calculates the ranges North and East from the aircraft to the zero speed indicator based on the horizontal speed and acceleration and the bank and true heading angles. The horizontal solution module 718 uses a high speed solution 724 when the aircraft is traveling faster than a cutoff speed (flight where automatic turn coordination may be active), a low speed solution 726 when the aircraft is traveling slower than the cutoff speed (flight where automatic turn coordination is inactive), or a combination of the two when transitioning from the use of one to the other. The outputs from the high speed solution 724 and the low speed solution 726 are fed into a distances fader 728. Based upon the speed of the aircraft relative to the cutoff speed, the distances fader 728 selects the ranges North and East to the zero speed indicator determined by either the high speed solution 724 or the low speed solution 726 or by a combination of both when transitioning selection from one to the other. The distances fader 728 smooths successive calculations of the ranges North and East to prevent the zero speed indicator from "jumping" around the display.

The high speed solution 724 produces an estimated location for the zero speed indicator when the horizontal speed of the aircraft is above a predefined threshold speed (e.g., at or above X knots). The high speed solution 724 is performed when the aircraft is moving fast enough in the forward direction for the aircraft to turn (i.e., change forward heading) by banking (i.e., rolling the aircraft to tilt one wing higher than the other, also referred to as turn coordination). The basis of the calculations of the high speed solution 724 is a specified deceleration profile that defines what the aircraft deceleration should be at any given groundspeed; the deceleration profile may be adjusted accordingly to closely match the approach procedures that correspond to a specific mission. The high speed solution 724 models the effects of a pilot simultaneously 1) modifying aircraft acceleration such that the acceleration matches the deceleration profile and 2) returning the aircraft to wings level, if bank angle is non zero, at a specified roll rate W to produce the quantities $D_N$, $D_E$, $V_G$, and GTA. $D_N$ and $D_E$ are the distances North and East that the aircraft would need to fly to allow for zeroing bank angle and for matching the deceleration of the aircraft to the profile; $V_G$ and GTA are the predicted groundspeed and ground track angle, respectively, at $D_N$ and $D_E$ from the aircraft. The high speed solution 724 then uses the deceleration profile to calculate a range to the landing zone R, measured from the point $D_N$ and $D_E$ from the aircraft where the aircraft would be flying on profile at groundspeed $V_G$. $RN_{HS}$ and $RE_{HS}$, the ranges North and East to the zero speed indicator as determined by the high speed solution 724, are then calculated using Formula 1.

$$RN_{HS} = D_N + R*\cos(GTA)$$

$$RE_{HS} = D_E + R*\sin(GTA) \quad \text{[Formula 1]}$$

The low speed solution 726 produces an estimated location for the zero speed indicator when the horizontal speed of the aircraft is below a predefined threshold speed (e.g., at or below Y knots) below which the aircraft is not moving fast enough in the forward direction for the aircraft to turn by rolling. In various aspects, the low speed solution 726 is only activated when the high speed solution 724 is deactivated (e.g., where X=Y) and vice versa. In other aspects, the low speed solution 726 and the high speed solution 724 are both activated during an overlap speed range (e.g., where Y>X).

For example, when the low speed solution 726 is activated when the aircraft is traveling at or below 60 knots (e.g., Y=60) and the high speed solution 724 is activated when the aircraft is traveling at or above 40 knots (e.g., X=40), the horizontal solution module 718 can receive input from both the low speed solution 726 and the high speed solution 724 when the aircraft is traveling between 60 and 40 knots. When both the low speed solution 726 and the high speed solution 724 are activated, the distances fader 728 combines the sets of coordinates output by the two solutions, based upon aircraft speed, to determine what coordinates to locate the zero speed indicator at.

The various velocities, accelerations, and times referred to in relation to the low speed solution 726 can be discussed as individual vectors or values in an x direction or y direction as indicated with a subscript x or y, respectively. Any value discussed without such a subscript can be understood to refer to a combined x-y plane value or both the x and y vectors. For example, an acceleration vector A includes an x (longitudinal) component $A_x$ and a y (lateral) component $A_y$.

The low speed solution 726 uses either or both of an azimuth dependent solution 730 and an azimuth independent solution 732 to determine a target acceleration vector $A_1$ from the current acceleration and velocity vectors $A_0$ and $V_0$. The target acceleration vector $A_1$ is calculated such that, after aircraft acceleration is transitioned from $A_0$ to $A_1$, $A_1$ will directly oppose the resulting velocity vector $V_2$. Target acceleration vectors from both the azimuth dependent solution 730 and the azimuth independent solution 732 are received by a target acceleration fader 734. The target acceleration fader 734 selects either target acceleration vector, or a combination of both, based upon current aircraft acceleration and velocity. The selected target acceleration is then passed to method 900 where the target acceleration is used to determine the distance from the aircraft that the zero speed indicator is to be located. Method 900 accomplishes this by first calculating the distance that the aircraft would cover as aircraft acceleration is transitioned from the current vector $A_0$ to the target vector $A_1$ and then summing this with the distance the aircraft would traverse as the resulting velocity vector $V_2$ is driven to zero magnitude by the target acceleration $A_1$. In various aspects, the low speed solution 726 receives pre-processed acceleration data from an acceleration limiter 736.

The acceleration limiter 736 places limits upon the acceleration measured along the aircraft x and y shadow axes as the acceleration is used by various components of the low speed solution 726. The acceleration limiter 736 affects both accelerations and decelerations; however, in various aspects, the acceleration limiter 736 limits decelerations to a lesser extent than accelerations. The acceleration limiter 736 smooths accelerations and decelerations as the values approach respective limits to prevent abrupt contact with those limits, thereby reducing the likelihood of limiting having a transient effect upon the calculation of the distances to the zero speed indicator. For acceleration from zero velocity, the acceleration limiter 736 initially uses a slightly higher value for the acceleration limit, but the acceleration limiter 736 gradually reduces the limit to a minimum value as velocity is increased.

The acceleration limiter 736 limits the acceleration along a given aircraft axis $a_0$, which is also subject to a velocity $v_0$, in two steps, i.e. the acceleration limiter 736 applies two tiers of limits.

The acceleration limiter 736 first calculates the base limit $a_1$ using Formula 2. The magnitude of $a_1$ is proportional to velocity $v_0$—via constant L—but the sign of $a_1$ opposes the sign of $v_0$. The acceleration limiter 736 then limits the base limit $a_1$ to C, the magnitude of the target acceleration vector used by the azimuth dependent solution 730, by applying Formula 3.

$$a_1 = -L * v_0 \qquad \text{[Formula 2]}$$

$$a_1 = \min(C, \max(a_1, -C)) \qquad \text{[Formula 3]}$$

The acceleration limiter 736 calculates the first-tier upper (acceleration) and lower (deceleration) limits, $\lim 1_{HI}$ and $\lim 1_{LO}$, from the base limit $a_1$ and specified constant bias d lim 1 per Formula 4 and Formula 5.

$$\lim 1_{HI} = a_1 + d \lim 1 \qquad \text{[Formula 4]}$$

$$\lim 1_{LO} = a_1 - d \lim 1 \qquad \text{[Formula 5]}$$

The acceleration limiter 736 applies the first-tier limits to $a_0$ to yield $a_{\lim 1}$ using Formula 6 and then calculates $a_2$, the amount by which $a_0$ exceeds $a_{\lim 1}$, per Formula 7.

$$a_{\lim 1} = \min(\lim 1_{HI}, \max(a_0, \lim 1_{LO})) \qquad \text{[Formula 6]}$$

$$a_2 = a_0 - a_{\lim 1} \qquad \text{[Formula 7]}$$

The acceleration limiter 736 applies the second-tier limit to $a_2$, yielding $a_{\lim 2}$ by applying Formula 8, Formula 9, and Formula 10 that define an algorithm that acts to smooth the approach of $a_2$ to the associated limit for $a_2$, which is a constant of specified value d lim 2.

$$\text{ratio}_2 = a_2 / d \lim 2 \qquad \text{[Formula 8]}$$

$$\text{ratio}_2 = \min(\pi/2, \max(\text{ratio}_2, -\pi/2)) \qquad \text{[Formula 9]}$$

$$a_{\lim 2} = d \lim 2 * \sin(\text{ratio}_2) \qquad \text{[Formula 10]}$$

The acceleration limiter 736 completes the calculation of $a_{\lim}$, the limited value of acceleration along a given aircraft axis $a_0$, by summing the limited values from the two tiers per Formula 11.

$$a_{\lim} = a_{\lim 1} + a_{\lim 2} \qquad \text{[Formula 11]}$$

In general, the azimuth dependent solution 730 is for low aggression maneuvering, and the low speed solution 726 will transition to use of the azimuth independent solution 732 as maneuver aggression is increased. The combination of the acceleration limiter 736 and the target acceleration fader 734 accommodate the transition between low and high aggression maneuvering.

The azimuth dependent solution 730 may be configured as an iterative process that uses the current acceleration and velocity vectors (in the longitudinal and lateral directions) to determine a target acceleration vector of specified magnitude C. When the azimuth dependent solution 730 does not converge, the low speed solution 726 defers to the azimuth independent solution 732 to determine a target acceleration vector.

In this aspect, the symbology control module 720 receives input from the landing gear control unit 712, crew logic inputs 714, and the navigation and flight control computers 716 to determine whether or how the various symbols are displayed in the cockpit displays.

For example, to prevent symbols from cluttering the cockpit displays, the symbology control module 720 can prevent the display until certain conditions are satisfied. In a further example, the symbols can be displayed in response to the landing gear being deployed and the rotors or jets of the aircraft being configured (e.g., rotated or ducted) for landing, and not displayed when the landing gear are retracted or the rotors or jets are configured for forward flight rather than landing operations. Similarly, if the distance from ground or forward speed is above a threshold value, the symbology control module 720 can prevent the display of the landing symbols.

The vertical solution module 722 determines how to display the vertical deviation cue and the descent command indicator. In various aspects, the vertical solution module 722 develops an altitude profile 738 for the aircraft based on data received from a radar altimeter in the aircraft, aircraft speed, direction, accelerations, and combinations thereof. The altitude data may undergo terrain filtering 740 to account for hilly or uneven terrain, which could lead to overshooting or undershooting the correct vertical distance to the landing zone.

Additionally, by combining, filtering or smoothing over time vertical velocity and downward facing radar altimeter data, the vertical solution module 722 can reject abrupt features in the environment (e.g., building, vehicles, flag poles, ravine edges) to form a better understanding of the general space below the aircraft. The vertical solution module 722 monitors the filtered terrain data and current ROD to the landing zone to adjust the ROD profile 742. The amount of adjustment may be limited based on the distance to the zero speed location determined by the horizontal solution module 718.

The ROD profile 742 indicates how quickly the aircraft is to descend based on the current aircraft acceleration in order to parallel the altitude versus speed profile. When the ROD profile 742 is combined with the altitude profile a Rate of Descent command is generated to reach the ground at the zero (horizontal) speed location. This Rate of Descent command is adjusted by a limiting function 744 based on the capabilities of the aircraft to climb/descend and not enter the aircraft's own down draft or rotor wash (e.g., descending faster than a sink rate threshold). The combination of the ROD profile 742, altitude profile 738 and terrain filtering 750, is limited (according to limiting function 744), and then provided as the descent command indicator. Additionally, the difference between the ROD profile and the current vertical speed is calculated as the vertical speed deviation 746, which is displayed as the vertical deviation cue.

Figure 8:
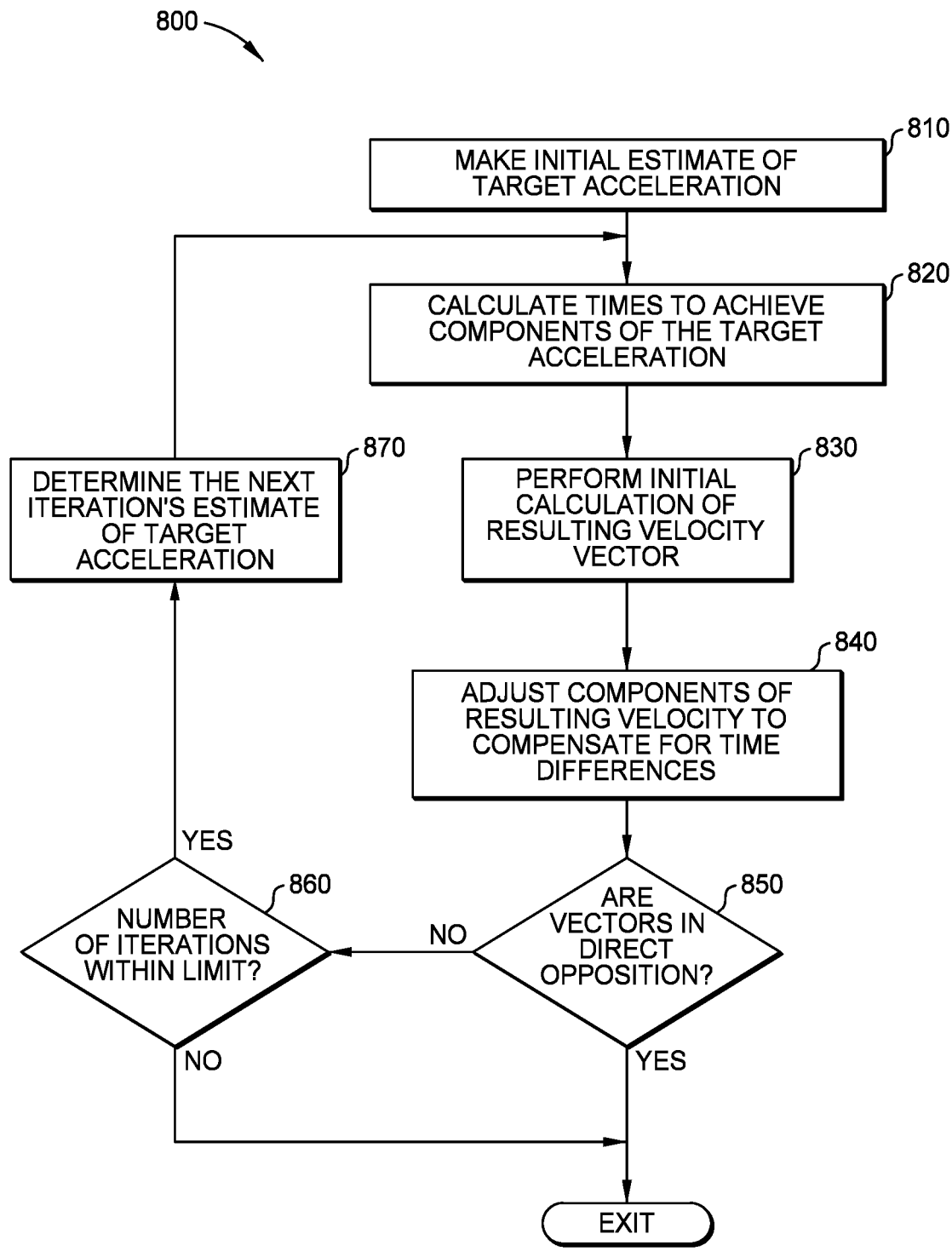
FIG. 8 is a flowchart of a method performed by the azimuth dependent solution, according to aspects of the present disclosure.

FIG. 8 is a flowchart of a method 800 performed by the azimuth dependent solution 730, according to aspects of the present disclosure. At block 810, the azimuth dependent solution 730 makes an initial estimate of a target acceleration vector $A_1$ using Formula 12, by calculating a vector of magnitude C that opposes the current velocity vector $V_0$, where $\alpha_0$ is the azimuth of $V_0$ relative to the nose of the aircraft.

$$A_{x1} = -C^*\cos(\alpha_0)$$

$$A_{y1} = -C^*\sin(\alpha_0) \quad \text{[Formula 12]}$$

At block 820, the azimuth dependent solution 730 identifies a time $T_1$ needed to change from the current acceleration vector $A_0$ to the target acceleration vector $A_1$ based on a hover acceleration rate limit H for the aircraft, which is the rate of change of acceleration that the aircraft is comfortably capable of when in a hover mode. Accordingly, time $T_1$ can be calculated according to Formula 13.

$$T_{x1} = |A_{x1} - A_{x0}|/H$$

$$T_{y1} = |A_{y1} - A_{y0}|/H \quad \text{[Formula 13]}$$

At block 830, the azimuth dependent solution 730 makes an initial calculation of the resulting velocity vector $V_1$, i.e. the velocity vector that results from transitioning aircraft acceleration from $A_0$ to $A_1$, using Formula 14, where R is the sign of the hover acceleration rate limit which is based upon whether the required change in acceleration is forward or right (positive) or aft or left (negative).

$$V_{x1} = V_{x0} + A_{x0}^* T_{x1} + (R_x^* H^* T_{x1}^2)/2$$

$$V_{y1} = V_{y0} + A_{y0}^* T_{y1} + (R_y^* H^* T_{y1}^2)/2 \quad \text{[Formula 14]}$$

When the times to achieve the components of the target acceleration in each axis $T_{x1}$ and $T_{y1}$ do not agree, the azimuth dependent solution 730 makes an adjustment to the initial calculation of the resulting velocity vector $V_1$ to yield the resulting velocity vector $V_2$ by applying Formula 15 and Formula 16 at block 840.

$$T_{x2} = \begin{cases} T_{y1} - T_{x1} & \text{if } T_{y1} > T_{x1} \\ 0 & \text{if } T_{y1} \leq T_{x1} \end{cases} \quad \text{[Formula 15]}$$

$$T_{y2} = \begin{cases} T_{x1} - T_{y1} & \text{if } T_{x1} > T_{y1} \\ 0 & \text{if } T_{x1} \leq T_{y1} \end{cases}$$

$$V_{x2} = V_{x1} + A_{x1} * T_{x2} \quad \text{[Formula 16]}$$

$$V_{y2} = V_{y1} + A_{y1} * T_{y2}$$

At block 850, the azimuth dependent solution 730 determines if the target acceleration vector $A_1$ and the resulting velocity vector $V_2$ directly oppose each other, i.e. if a solution has been converged upon. The azimuth of the resulting velocity vector $\alpha_2$ is calculated using Formula 17, the azimuth of the target acceleration vector $\beta_1$ is determined by applying Formula 18, and the difference of the two azimuths $\delta$ is calculated from Formula 19. If $\delta$ indicates that the azimuth angles are nearly supplementary, then the azimuth dependent solution 730 is considered to have converged.

$$\alpha_2 = \arctan 2(V_{y2}, V_{x2}) \quad \text{[Formula 17]}$$

$$\beta_1 = \arctan 2(A_{y1}, A_{x1}) \quad \text{[Formula 18]}$$

$$\delta = \alpha_2 - \beta_1 \quad \text{[Formula 19]}$$

If the azimuth dependent solution 730 has not converged upon an acceptable value for the target acceleration vector $A_1$, then at block 860 the azimuth dependent solution 730 evaluates the number of estimates of target acceleration that have been made during the current computation cycle, i.e. the number of iterations that the azimuth dependent solution 730 has performed. If the number of iterations performed is less than a specified limit or iteration threshold, then the azimuth dependent solution 730 continues processing at block 870; otherwise, the azimuth dependent solution 730 ceases processing for the current computation cycle, outputting the last calculated value of target acceleration vector $A_1$.

At block 870, the azimuth dependent solution 730 makes a new estimate of the target acceleration $A_1$ using Formula 20 and Formula 21. Formula 20 estimates a new value for the azimuth of the resulting velocity vector $\alpha$, based upon the feedback of the value used to estimate $A_1$ during the previous iteration $\alpha_{prev}$ and the feedback of the value of $\alpha_2$ determined during the previous iteration, by using iteration gain G. Formula 21 then calculates the new estimate of target acceleration $A_1$ in the same manner as Formula 12.

$$\alpha = \alpha_{prev} + G^*(\alpha_2 - \alpha_{prev})$$ [Formula 20]

$$A_{x1} = -C^*\cos(\alpha)$$

$$A_{y1} = -C^*\sin(\alpha)$$ [Formula 21]

The azimuth dependent solution 730 then evaluates the new estimate of the target acceleration $A_1$ as before by continuing processing at block 820.

When the azimuth dependent solution 730 begins a new computation cycle, i.e. when method 800 again initiates processing at block 810, the initial estimate of the target acceleration $A_1$ may be calculated differently than is shown by Formula 12. If during the previous computation cycle the azimuth dependent solution 730 successfully converged upon an acceptable value for the target acceleration $A_1$, then the azimuth of the resulting velocity vector determined during the previous cycle's iterations is used in Formula 12 in place of the azimuth of the current velocity vector. This is intended to help the azimuth dependent solution 730 converge upon a solution in fewer iterations.

As the azimuth dependent solution 730 is iterative and is not always guaranteed to converge upon an acceptable value of the target acceleration $A_1$, an azimuth independent solution 732 is used to determine the target acceleration $A_1$ in those cases of non-convergence instead.

The azimuth independent solution 732 does not calculate a target acceleration vector $A_1$ with a specified magnitude C, but rather considers the x and y axes separately by calculating a target acceleration for each axis with a maximum value of C. The calculations are performed such that the target acceleration determined for each axis is scaled down at lower speeds so that the speeds approach zero as the aircraft approaches the zero speed location.

Formula 22 forms the basis of the determination of the target acceleration along the x shadow axis $A_{x1}$ by the azimuth independent solution 732. Formula 22 represents two maneuvers along the x shadow axis that result in zero speed. The times to accomplish the two maneuvers are the unknowns $T_{x1}$ and $T_{x2}$. $T_{x1}$ is the time required to reach the target acceleration $A_{x1}$ from current acceleration $A_{x0}$ at the rate of change of aircraft acceleration in a hover H having a sign $R_x$ (where $R_x$ is 1 for increasing acceleration and −1 for decreasing acceleration). $T_{x2}$ is the time needed to then drive the velocity, resulting from the transition from $A_{x0}$ to $A_{x1}$, to zero at the target acceleration $A_{x1}$.

$$V_{x0} + A_{x0}*T_1 + (R_x*H*T_{x1}^2)/2 + A_{x0}*T_{x2} + R_x*H*T_{x1}*T_{x2} = 0$$ [Formula 22]

In order to solve Formula 22 for $T_{x1}$, a constant B is introduced and assigned an appropriate value. B represents the inverse of $T_{x2}$ and is sized assuming that, at and above a specified low speed, acceleration is at the maximum specified value C, and below that specified low speed, acceleration varies linearly with speed.

The azimuth independent solution 732 may then solve Formula 22 for $T_{x1}$ using Formula 23.

$$T_{x1} = \frac{-b + R_x * \sqrt{b^2 - 4*a*c}}{2*a}$$ [Formula 23]

In Formula 23, a is calculated by Formula 24, b is calculated by Formula 25, and c is calculated by Formula 26.

$$a = B*R_x*H/2$$ [Formula 24]

$$b = B*A_{x0} + R_x*H$$ [Formula 25]

$$c = B*V_{x0} + A_{x0}$$ [Formula 26]

The azimuth independent solution 732 may then use $T_{x1}$ to determine the target acceleration for the x shadow axis $A_{x1}$ using Formula 27 and apply Formula 28 to limit $A_{x1}$ to the maximum specified value C and ε, where ε is small.

$$A_{x1} = A_{x0} + R_x * H * T_{x1}$$ [Formula 27]

$$A_{x1} = \begin{cases} \min(C, \max(A_{x1}, \varepsilon)) \text{ if } (R_x > 0) \\ \max(-C, \min(A_{x1}, -\varepsilon)) \text{ if } (R_x < 0) \end{cases}$$ [Formula 28]

Prior to evaluating Formula 23, the azimuth independent solution 732 checks if Formula 23 is solvable, and also determines an appropriate value for the sign of the rate of change of acceleration $R_x$.

If the current acceleration along the x shadow axis $A_{x0}$ is greater than or equal to zero, then the azimuth independent solution 732 evaluates the inequality Formula 29.

$$V_{x0} \geq -A_{x0}^2/(2*H)$$ [Formula 29]

If the inequality Formula 29 is true, then a solution exists where both the sign and magnitude of acceleration are changed; therefore, the azimuth independent solution 732 assigns a value of −1 to $R_x$ and determines the x shadow axis target acceleration $A_{x1}$ using Formula 23 through Formula 28.

If the inequality Formula 29 is not true, then a solution exists where the sign of acceleration is unchanged but the magnitude of acceleration is increased. If the current acceleration along the x shadow axis $A_{x0}$ is less than the specified maximum acceleration C, then the azimuth independent solution 732 assigns a value of +1 to $R_x$ and determines the x shadow axis target acceleration $A_{x1}$ using Formula 23 through Formula 28; otherwise, the azimuth independent solution 732 assigns the specified maximum acceleration C to the x shadow axis target acceleration $A_{x1}$, bypassing Formula 23 through Formula 28.

If the current acceleration along the x shadow axis $A_{x0}$ is less than zero, then the azimuth independent solution 732 evaluates the inequality Formula 30.

$$V_{x0} \leq A_{x0}^2/(2*H)$$ [Formula 30]

If the inequality Formula 30 is true, then a solution exists where both the sign and magnitude of acceleration are changed; therefore, the azimuth independent solution 732 assigns a value of +1 to $R_x$ and determines the x shadow axis target acceleration $A_{x1}$ using Formula 23 through Formula 28.

If the inequality Formula 30 is not true, then a solution exists where the sign of acceleration is unchanged but the magnitude of acceleration is increased. If the current acceleration along the x shadow axis $A_{x0}$ is greater than the negative of the specified maximum acceleration C, then the azimuth independent solution 732 assigns a value of −1 to $R_x$ and determines the x shadow axis target acceleration $A_{x1}$ using Formula 23 through Formula 28; otherwise, the azimuth independent solution 732 assigns the negative of the specified maximum acceleration C to the x shadow axis target acceleration $A_{x1}$, bypassing Formula 23 through Formula 28.

The azimuth independent solution 732 also performs the preceding algorithm, using the current acceleration and velocity along the y shadow axis $A_{y0}$ and $V_{y0}$ instead, to determine the target acceleration along the y shadow axis $A_{y1}$.

In this aspect, both the azimuth dependent solution 730 and the azimuth independent solution 732 execute during a given computation cycle, each producing a version of the target acceleration vector $A_1$. The target acceleration vector calculated by the azimuth dependent solution 730 may be referred to $A_{1dep}$, and the target acceleration vector determined by the azimuth independent solution 732 may be referred to as $A_{1ind}$.

The target acceleration fader 734 determines $A_{x1fade}$ and $A_{y1fade}$, the components of the target acceleration vector for use by method 900 in the calculation of the distances to the zero speed indicator for the low speed solution 726. The target acceleration fader 734 selects the components calculated by the azimuth dependent solution 730, the components calculated by the azimuth independent solution 732, or a combination of both. The target acceleration fader 734 makes the selection based upon current aircraft groundspeed and acceleration.

The groundspeed below which convergence of the azimuth dependent solution 730 is not guaranteed is referred to as $v_{ind}$. Formula 31 and Formula 32 define $v_{ind}$ as a function of aircraft acceleration along the aircraft velocity vector $a_v$. The constants VINDA, VINDB, and VINDC used in Formula 32 represent a second-order curve fit that is determined empirically.

$$a_v = \min(a_v, 0) \quad \text{[Formula 31]}$$

$$v_{ind} = VINDA * a_v^2 + VINDB * a_v + VINDC \quad \text{[Formula 32]}$$

The target acceleration fader 734 assigns the components of the target acceleration vector determined by the azimuth independent solution 732 $A_{x1ind}$ and $A_{y1ind}$ to $A_{x1fade}$ and $A_{y1fade}$, respectively, when aircraft groundspeed is less than $v_{ind}$.

The target acceleration fader 734 assigns the components of the target acceleration vector determined by the azimuth dependent solution 730 $A_{x1dep}$ and $A_{y1dep}$ to $A_{x1fade}$ and $A_{y1fade}$, respectively, when aircraft groundspeed is greater than $v_{dep}$, where $v_{dep}$ is offset from $v_{ind}$ by constants VINDG and VINDD per Formula 33.

$$v_{dep} = \max(v_{ind} * VINDG, v_{ind} + VINDD) \quad \text{[Formula 33]}$$

When aircraft groundspeed $v_{tot}$ is between $v_{ind}$ and $v_{dep}$, the target acceleration fader 734 determines $A_{x1fade}$ and $A_{y1fade}$ using a combination of the versions of the target acceleration vectors from both the azimuth dependent solution 730 and the azimuth independent solution 732. The target acceleration fader 734 calculates a gain, AzGain, to determine what proportion of each solution's target accelerations to use, per Formula 34. The target acceleration fader 734 then applies AzGain per Formula 35 to calculate $A_{x1fade}$ and $A_{y1fade}$.

$$AzGain = (v_{tot} - v_{ind})/(v_{dep} - v_{ind}) \quad \text{[Formula 34]}$$

$$A_{x1fade} = AzGain * A_{x1dep} + (1-AzGain) * A_{x1ind}$$

$$A_{y1fade} = AzGain * A_{y1dep} + (1-AzGain) * A_{y1ind} \quad \text{[Formula 35]}$$

The target acceleration fader 734 maintains a one-way low-pass filter on the calculation of AzGain. The target acceleration fader 734 applies the low-pass filter to the calculation of AzGain only when AzGain is increasing. This acts to suppress significant steps in the calculated distance to the zero speed indicator that are observed to occur along one shadow axis when the aircraft is subjected to a high acceleration along the other shadow axis.

Figure 9:
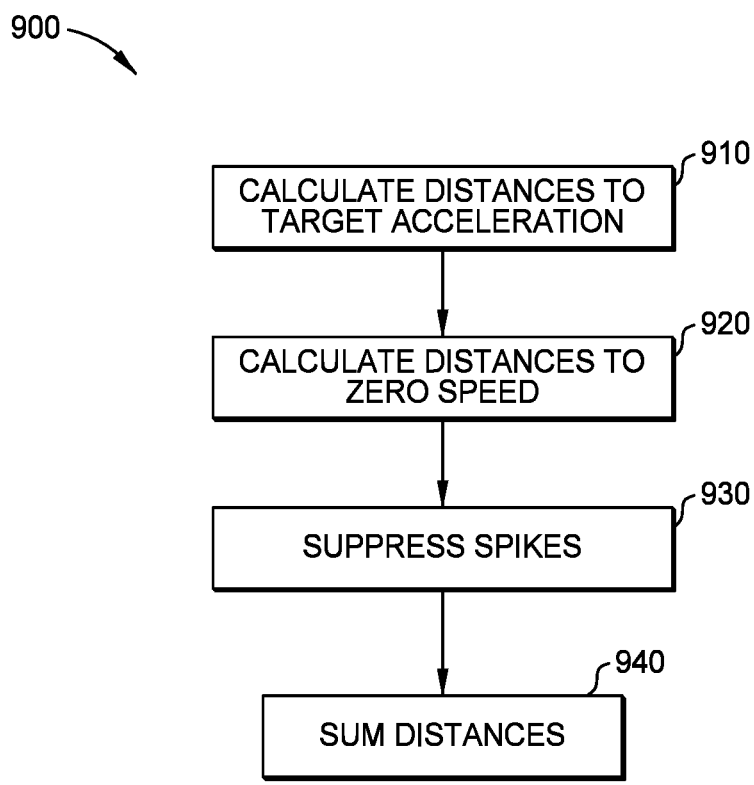
FIG. 9 is a flowchart of a method for providing landing symbology according to aspects of the present disclosure.

FIG. 9 is a flowchart of method 900 for the calculation of the distances to the zero speed indicator for the low speed solution 726. Method 900 is continuously performed while the symbology control module 720 determines that the zero speed indicator should be projected to a display. Method 900 begins at block 910 where the low speed solution 726 calculates the distances in the x and y shadow axes that the aircraft would traverse as the acceleration vector of the aircraft is adjusted from an initial value $A_0$ to the target value selected by the target acceleration fader 734 $A_{1fade}$. The low speed solution 726 calculates the vectors $T_1$, $V_1$, $T_2$, and $V_2$ using Formula 13 through Formula 16 as described above, substituting $A_{1fade}$ for $A_1$. The low speed solution 726 then uses these vectors to calculate the requisite distance in two parts, vectors $D_1$ and $D_2$, per Formula 36 and Formula 37.

$$D_{x1} = V_{x0} * T_{x1} + (A_{x0} * T_{x1}^2)/2 + (R_x * H * T_{x1}^3)/6$$

$$D_{y1} = V_{y0} * T_{y1} + (A_{y0} * T_{y1}^2)/2 + (R_y * H * T_{y1}^3)/6 \quad \text{[Formula 36]}$$

$$D_{x2} = V_{x1} * T_{x2} + (A_{x1fade} * T_{x2}^2)/2$$

$$D_{y2} = V_{y1} * T_{y2} + (A_{y1fade} * T_{y2}^2)/2 \quad \text{[Formula 37]}$$

At block 920, the low speed solution 726 calculates vector $D_3$; the distances in the x and y shadow axes that the aircraft would traverse as the resulting velocity vector $V_2$ is driven to zero magnitude at the target acceleration $A_{1fade}$. As vector $A_{1fade}$ is calculated such that vector $A_{1fade}$ directly opposes vector $V_2$, the low speed solution 726 applies Formula 38 to determine $D_3$.

$$D_{x3} = -V_{x2}^2/(2 * A_{x1fade})$$

$$D_{y3} = -V_{y2}^2/(2 * A_{y1fade}) \quad \text{[Formula 38]}$$

At block 930, the low speed solution 726 suppresses any spikes that are evident in the components of vector $D_3$. In various aspects, use of the azimuth dependent solution 730 can produce an out-of-family value when the resulting velocity vector $V_2$ is very close to either the x or y shadow axis; the spike may occur in the calculation of the distance along the shadow axis that is nearly perpendicular to $V_2$. In block 930 the low speed solution 726 checks for evidence of a spike only when $V_2$ is within a specified angular distance of one of the shadow axes. When this is the case, the low speed solution 726 calculates $T_3$, which represents the time for the components of the resulting velocity vector $V_2$ to be driven to zero by the target acceleration vector $A_{1fade}$, using Formula 39. If $V_2$ is close to the x shadow axis, the low speed solution 726 then applies Formula 40; otherwise, the low speed solution 726 applies Formula 41.

$$T_{x3} = |V_{x2}/A_{x1fade}|$$

$$T_{y3} = |V_{y2}/A_{y1fade}| \quad \text{[Formula 39]}$$

$$D_{y3} = \begin{cases} 0 & \text{if } (T_{y3} > 2 * T_{x3}) \\ D_{y3} & \text{if } (T_{y3} \le 2 * T_{x3}) \end{cases} \quad \text{[Formula 40]}$$

$$D_{x3} = \begin{cases} 0 & \text{if } (T_{x3} > 2 * T_{y3}) \\ D_{x3} & \text{if } (T_{x3} \le 2 * T_{y3}) \end{cases} \quad \text{[Formula 41]}$$

At block 940, the low speed solution 726 sums the distances calculated per blocks 910, 920, and 930 to obtain $D_{LS}$, the distances to the zero speed indicator along the x and y shadow axes, using Formula 42. The low speed solution 726 then transforms the vector $D_{LS}$ into North and East coordinates using true heading to produce $RN_S$ and $RE_{LS}$, the ranges North and East to the zero speed indicator.

$$D_{xLS} = D_{x1} + D_{x2} + D_{x3}$$

$$D_{yLS} = D_{y1} + D_{y2} + D_{y3} \quad \text{[Formula 42]}$$

Figure 10:
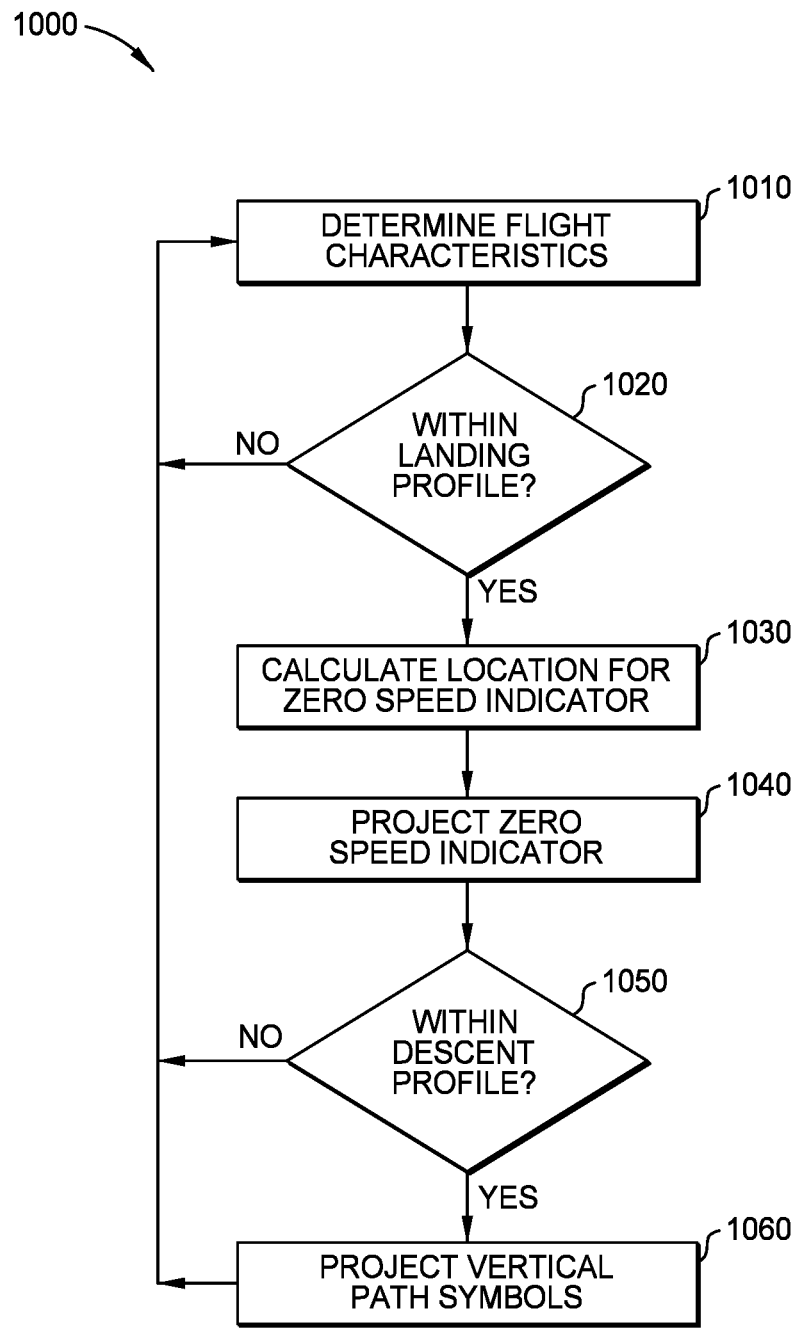
FIG. 10 is a flowchart of a method for providing landing symbology, according to aspects of the present disclosure.

FIG. 10 is a flowchart of a method 1000 for providing some or all of the landing symbology, according to aspects of the present disclosure.

Method 1000 begins with block 1010, where the architecture determines current flight characteristics for an aircraft. In various aspects, the flight characteristics include: vertical speed, vertical acceleration, horizontal speed (which may be separated into north/south and east/west components), horizontal acceleration (which may be separated into north/south and east/west components), roll of the aircraft, and distance to the ground from the aircraft. Display of the horizontal symbols is independent of the vertical symbols, however vertical symbols require horizontal symbols to have first been displayed.

At block 1020, the architecture determines whether the aircraft is in a landing profile. For example, the aircraft can be determined to be in the deceleration profile when the aircraft is traveling below a given speed, or is within a predefined distance of a predefined landing zone. The aircraft can subsequently be determined to be within a descent profile based upon being below a slower given speed (e.g., below a speed an deceleration threshold for terminal guidance), having configured a thrust vectoring system for vertical landing (e.g., placing a propeller nacelle, rotor, jet-ducting, or other propulsor in a down-thrust position versus a back-thrust position), having extended landing gear, or combinations thereof. Additionally or alternatively, the aircraft can be determined to not be in the landing profile when the aircraft is carrying weight on the landing gear for a given length of time (e.g., is already landed) or for a predefined amount or time or distance after being on ground (e.g., has recently landed and taken off again). When the architecture determines that the aircraft is within a landing profile, method 1000 proceeds to block 1030. When the architecture additionally determines that the aircraft is within a descent profile, method 1000 proceeds to block 1060. Otherwise, method 1000 returns to block 1010 to continue monitoring flight characteristics of the aircraft.

Method 1000 may continue to classify the aircraft as being in the deceleration or descent profile until the architecture determines that the aircraft has landed (or is in a takeoff profile) or has otherwise cancelled the landing profile and resumed flight operations (e.g., foregoing landing or realigning for a subsequent landing attempt).

At block 1030, the architecture calculates where to locate a zero speed indicator for the aircraft based on the current flight characteristics. Depending on the forward speed of the aircraft, the architecture can use one or both of a high speed solution or a low speed solution, depending on whether roll of the aircraft affects the heading of the aircraft. In various aspects, as is described in relation to FIG. 7, the architecture calculates several distances from the current position of the aircraft to determine where zero forward speed will be achieved based on different deceleration profiles and the time needed to reach those deceleration profiles and the distance covered by the aircraft during those times.

At block 1040, the architecture projects the zero speed indicator on a display in the aircraft, which can include instrument panel displays, HUDs for the aircraft, and personal HUDs for crewmembers of the aircraft.

In various aspects, the zero speed indicator is displayed in relation to a field of view through a HUD element (e.g., a cockpit glass, window, or display/film between the pilot and the cockpit glass or window) or in relation to a map. Additionally, the relative location of the zero speed indicator relative to a projected landing zone indicator provides information to the pilot about the current deceleration and descent profile. For example, when projecting a landing zone indicator (e.g., at a location on the display corresponding to coordinates preselected in a flight plan for where the aircraft is to land) in the same display as the zero speed indicator, projecting the zero speed indicator after the landing zone indicator in a direction of travel for the aircraft indicates that the aircraft will reach zero forward speed in the direction of travel after the aircraft passes the coordinates according to the current flight characteristics. In another example, when projecting the zero speed indicator before the landing zone indicator in the direction of travel for the aircraft, the relative locations of the landing symbols indicates that the aircraft will reach zero forward speed in the direction of travel before the aircraft passes the coordinates according to the current flight characteristics.

At block 1050, the architecture determines whether the aircraft is within a descent profile portion of the landing profile. For example, when the aircraft is traveling below a given speed, is within a predefined distance of a predefined landing zone, has extended landing gear, or combinations thereof. When the architecture determines that the aircraft is within a descent profile, method 1000 proceeds to block 1060. Otherwise, method 1000 returns to block 1010 to continue monitoring flight characteristics of the aircraft.

At block 1060, the architecture projects vertical targeting symbols to aid in performing a zero-zero landing. In some aspects, projecting the vertical targeting symbols includes projecting a vertical deviation cue in the display in association with the zero speed indicator. In some aspects, projecting the vertical targeting symbols includes projecting a descent command indicator in the display and selecting a color or pattern to project the descent command indicator in based on whether the descent profile for the aircraft requires that the aircraft exceed a sink rate limit for the aircraft to achieve a zero-zero landing. Method 1000 then returns to block 1010 to continue monitoring flight characteristics of the aircraft.

Figure 11:
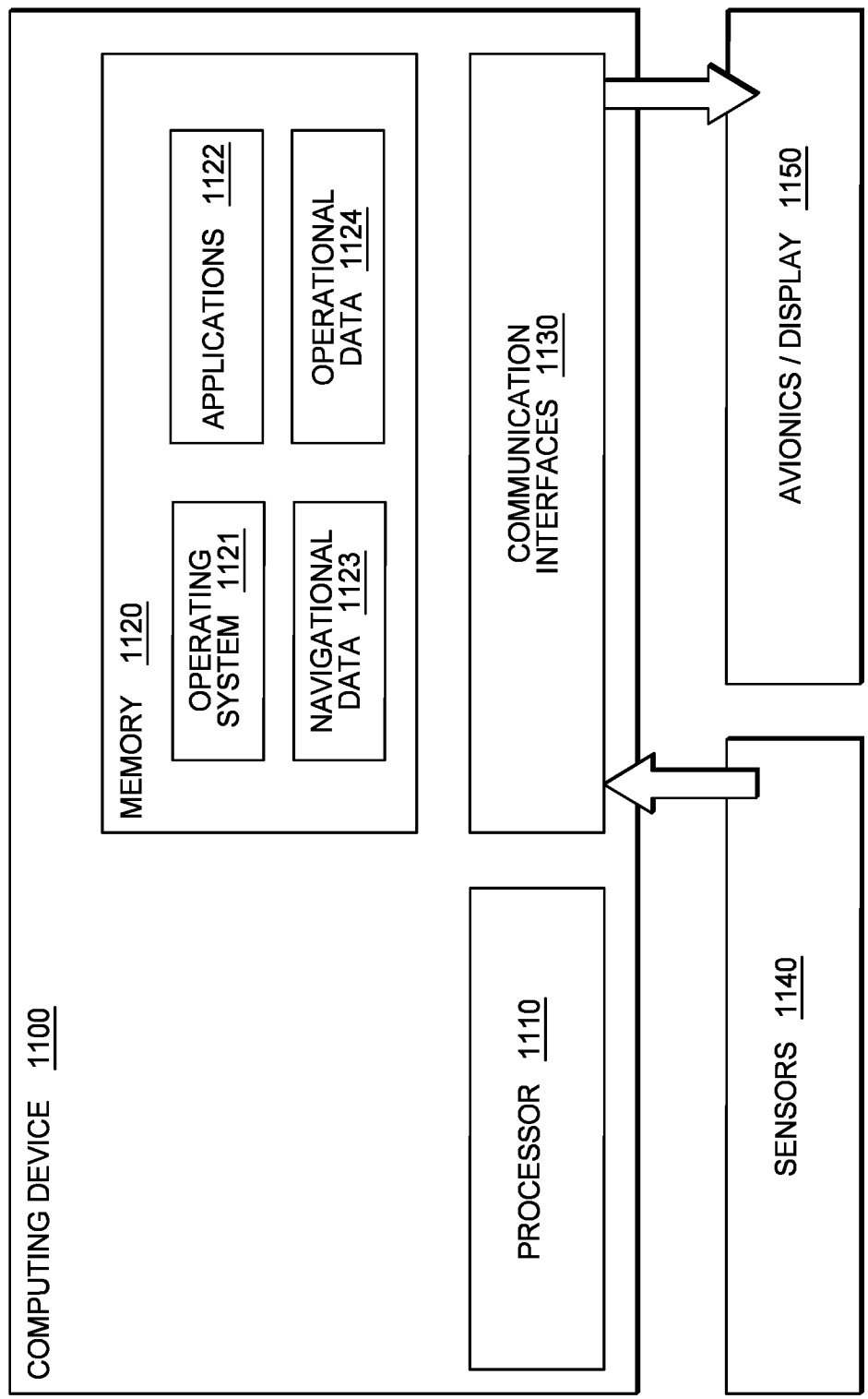
FIG. 11 illustrates a computing device, according to aspects of the present disclosure.

FIG. 11 illustrates a computing device 1100, according to aspects of the present disclosure. FIG. 11 illustrates example computing components of a computing device 1100 or other processing system as may be used to perform the calculations for where or whether to display landing symbols, to display the landing symbols, to gather and process data used in calculating where or whether to display the landing symbols, as well as other computing functionalities described or referenced in the present disclosure.

The computing device 1100 includes a processor 1110, a memory 1120, and an interface 1130. The processor 1110 and the memory 1120 provide computing functionality to run various programs and/or operations for the respective computing device 1100, including the storage and retrieval of the various data described herein.

The processor 1110, which may be any computer processor capable of performing the functions described herein, executes commands based on inputs received from a user and the data received from the interface 1130.

The memory 1120 is a computer-readable memory storage device that generally includes various processor-executable instructions, that when executed by the processor 1110, perform the various functions related to landing symbology as discussed herein. The processor-executable instructions may generally be described or organized into various "applications" or "modules" in the memory 1120, although alternate implementations may have different functions and/or combinations of functions. The memory 1120 also generally includes data structures that store information for use by or output by the various applications or modules. In the present disclosure, the memory 1120 includes at least instructions for an operating system 1121, one or more application(s) 1122 (including the horizontal solution module 718, a symbology control module 720, and a vertical solution module 722 discussed in relation to FIG. 7), navigational data 1123 (e.g., maps, coordinates for predefined landing zones or waypoints), and operational data 1124 (e.g., defining various operational thresholds and limits for the aircraft). The memory 1120 may be one or more memory devices, such as, for example, Random Access Memory (RAM), Read Only Memory (ROM), flash memory, or any other type of volatile or non-volatile storage medium that includes instructions that the processor 1110 may execute. As used herein, a memory storage device shall be understood to describe an apparatus and not a non-transitory signal.

The interface 1130 connects the computing device 1100 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 1130 is used to send and receive communications between computing devices 1100 and manage the generation of the landing symbols described herein. The interface 1130 receives data from various sensors 1140 included in the aircraft and transmits data to various avionics 1150 including the displays of the aircraft where the various landing symbology discussed herein are displayed according to aspects of the present disclosure.

The present disclosure can also be understood with reference to the following numbered clauses.

Clause 1: A method, comprising: determining current flight characteristics for an aircraft via navigational sensors included in the aircraft; calculating where to locate a zero speed indicator on a display in the aircraft based on the current flight characteristics; and projecting the zero speed indicator on the display.

Clause 2: The method of any one of clauses 1 or 3-7, further comprising: projecting a landing zone indicator at a location on the display corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the current flight characteristics; and wherein projecting the zero speed indicator before the landing zone indicator in the direction of travel for the aircraft, indicates that the aircraft will reach zero forward speed in the direction of travel before the aircraft passes the coordinates according to the current flight characteristics.

Clause 3: The method of any one of clauses 1, 2, or 3-7, wherein the zero speed indicator is displayed in response to determining that the aircraft is within a landing profile based on the current flight characteristics.

Clause 4: The method of any one of clauses 1-3 or 5-7, further comprising: projecting a vertical deviation cue in the display in association with the zero speed indicator in response to determining that the aircraft is within a descent profile based on the current flight characteristics.

Clause 5: The method of any one of clauses 1-4, 6, or 7, further comprising: projecting a descent command indicator in the display in response to determining that the aircraft is within a descent profile based on the current flight characteristics; and wherein a color or pattern of the descent command indicator is based on whether the descent profile for the aircraft indicates that the aircraft will exceed a sink rate limit for the aircraft to achieve a zero-zero landing.

Clause 6: The method of any one of clauses 1-5 or 7, wherein calculating where to locate the zero speed indicator further comprises: calculating a first target acceleration vector according to an azimuth dependent solution; calculating a second target acceleration vector according to an azimuth independent solution to accommodate those instances where the azimuth dependent solution does not converge upon a value for the first target acceleration vector; selecting one of the first target acceleration vector, the second target acceleration vector, or a combination of both the first target acceleration vector and the second target acceleration vector based upon the current flight characteristics of the aircraft; calculating first distances from a current location of the aircraft to achieve a target acceleration vector and second distances to account for variances in the first distances; calculating third distances from reaching the target acceleration vector to reaching a zero speed location; suppressing spikes in the third distances; and summing the first distances, second distances, and third distances to determine a total distance from the current location to the zero speed location, where the zero speed indicator is located.

Clause 7: the method of any of clauses 1-6, wherein calculating where to locate the zero speed indicator further comprises: estimating an initial value for a target acceleration vector; calculating times for the aircraft to achieve the target acceleration vector; calculating an initial value for a velocity vector that results from transitioning to the target acceleration vector; adjusting components of the velocity vector to account for variances in the times to achieve the target acceleration vector; and in response to an iteration count being below an iteration threshold and the target acceleration vector converging with the velocity vector, estimating a second value for the target acceleration vector to be evaluated during a next iteration.

Clause 8: A method, comprising: in response to determining that an aircraft is within a deceleration and descent profile, displaying a zero speed indicator that indicates a location where the aircraft is calculated to reach zero horizontal speed and zero altitude according to a reference glide path based on flight characteristics determined via navigational sensors included in the aircraft.

Clause 9: The method of any of clauses 8 or 10-14, wherein determining that the aircraft is within the deceleration and descent profile is based on a distance of the aircraft to a zero speed indicator and whether the aircraft is configured for landing.

Clause 10: The method of any of clauses 8, 9, or 11-14, wherein the zero speed indicator is displayed relative to a map in an instrument panel that includes the location where the aircraft is to reach zero horizontal speed and zero altitude.

Clause 11: The method of any of clauses 8-10 or 12-14, wherein the zero speed indicator is displayed relative to a field of view in a heads up display that includes the location where the aircraft is to reach zero horizontal speed and zero vertical speed; and wherein display of the location where the aircraft is to reach zero horizontal speed is geo-correlated and conformal to a view outside of the aircraft.

Clause 12: The method of any of clauses 8-11, 13, or 14, further comprising: displaying a landing zone indicator at a second location corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the flight characteristics; and wherein projecting the zero speed indicator before the landing zone indicator in the direction of travel for the aircraft indicates that the aircraft will reach zero forward speed in the direction of travel before the aircraft passes the coordinates according to the flight characteristics.

Clause 13: The method of any of clauses 8-12 or 14, wherein the location where the aircraft is calculated to reach zero horizontal speed is calculated by: calculating a first distance from a current location of the aircraft to a first location where the aircraft reaches a target acceleration vector; calculating a second distance from the first location to a second location where the aircraft reaches zero speed by decelerating according to the target acceleration vector; and summing the first distance and the second distance to determine a total distance from the current location to a zero speed location, where the zero speed indicator is located.

Clause 14: The method of any of clauses 8-13, wherein determining that the aircraft is within the descent profile includes: determining that a forward speed of the aircraft is below a speed and deceleration threshold for terminal guidance; and determining that at least one of a propeller nacelle, thrust vectoring system, or propulsor of the aircraft is rotated to a down-thrust position from a back-thrust position and landing gear is deployed.

Clause 15: A memory storage device including instructions that when executed by a processor perform an operation comprising: determining current flight characteristics for an aircraft via navigational sensors included in the aircraft; calculating where to locate a zero speed indicator on a display in the aircraft based on the current flight characteristics; and projecting the zero speed indicator on the display.

Clause 16: The memory storage device of any of clauses 15 or 17-20, wherein the operation further comprises: projecting a landing zone indicator at a location on the display corresponding to coordinates preselected in a flight plan for where the aircraft is to land; wherein projecting the zero speed indicator after the landing zone indicator in a direction of travel for the aircraft indicates that the aircraft will reach zero forward speed in the direction of travel after the aircraft passes the coordinates according to the current flight characteristics; and wherein projecting the zero speed indicator before the landing zone indicator in the direction of travel for the aircraft indicates that the aircraft will reach zero forward speed in the direction of travel before the aircraft passes the coordinates according to the current flight characteristics.

Clause 17: The memory storage device of any of clauses 15, 16, or 18-20, wherein the operation further comprises, in response to determining that the aircraft is within a descent profile based on the current flight characteristics: projecting a vertical deviation cue in the display in association with the zero speed indicator; and projecting a descent command indicator in the display, wherein a color or pattern of the descent command indicator is based on whether the descent profile for the aircraft indicates that the aircraft will exceed a sink rate limit for the aircraft to achieve a zero-zero landing.

Clause 18: The memory storage device of any of clauses 15-17, 19, or 20, wherein the zero speed indicator is displayed relative to a map in an instrument panel that includes a location where the aircraft is to reach zero horizontal speed and zero altitude.

Clause 19: The memory storage device of any of clauses 15-18 or 20, wherein calculating where to locate the zero speed indicator further comprises: determining a limit for current aircraft acceleration; calculating a first target acceleration vector based on the limit for current aircraft acceleration and according to an azimuth dependent solution; calculating a second target acceleration vector based on the limit for current aircraft acceleration and according to an azimuth independent solution to accommodate those instances where the azimuth dependent solution does not converge upon a value for the first target acceleration vector; and selecting one of the first target acceleration vector, the second target acceleration vector, or a combination of both the first target acceleration vector and the second target acceleration vector based upon the current flight characteristics of the aircraft.

Clause 20: The memory storage device of any of clauses 15-19, wherein the memory storage device is included in the aircraft.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   determining current flight characteristics for an aircraft via navigational sensors included in the aircraft;
   calculating where to locate a zero speed indicator on a display in the aircraft based on the current flight characteristics; by:
   calculating a first target acceleration vector according to an azimuth dependent solution;
   calculating a second target acceleration vector according to an azimuth independent solution;
   selecting one of the first target acceleration vector, the second target acceleration vector, or a combination of both the first target acceleration vector and the second target acceleration vector based upon the current flight characteristics of the aircraft, and on whether the azimuth dependent solution converges; and
   calculating a distance from a current location of the aircraft to a zero speed location, based on a location where the selected target acceleration vector is achieved; and
   projecting the zero speed indicator on the display at the zero speed location.

2. The method of claim 1, further comprising:
   projecting a landing zone indicator at a location on the display corresponding to coordinates preselected in a flight plan for where the aircraft is to land;
   wherein projecting the zero speed indicator after the landing zone indicator in a direction of travel for the aircraft indicates that the aircraft will reach zero forward speed in the direction of travel after the aircraft passes the coordinates according to the current flight characteristics; and
   wherein projecting the zero speed indicator before the landing zone indicator in the direction of travel for the aircraft, indicates that the aircraft will reach zero forward speed in the direction of travel before the aircraft passes the coordinates according to the current flight characteristics.

3. The method of claim 1, wherein the zero speed indicator is displayed in response to determining that the aircraft is within a landing profile based on the current flight characteristics.

4. The method of claim 1, further comprising:
   projecting a vertical deviation cue in the display in association with the zero speed indicator in response to determining that the aircraft is within a descent profile based on the current flight characteristics.

5. The method of claim 1, further comprising:
   projecting a descent command indicator in the display in response to determining that the aircraft is within a descent profile based on the current flight characteristics; and
   wherein a color or pattern of the descent command indicator is based on whether the descent profile for the aircraft indicates that the aircraft will exceed a sink rate limit for the aircraft to achieve a zero-zero landing.

6. The method of claim 1, where the calculating where to locate the zero speed indicator further comprises:
   calculating first distances from the current location of the aircraft to achieve a target acceleration vector and second distances to account for variances in the first distances;
   calculating third distances from reaching the target acceleration vector to reaching the zero speed location;
   suppressing spikes in the third distances; and summing the first distances, second distances, and the third distances to determine a total distance from the current location to the zero speed location, where the zero speed indication is located.

7. The method of claim 6, wherein calculating where to locate the zero speed indicator further comprises:
estimating an initial value for a target acceleration vector;
calculating times for the aircraft to achieve the target acceleration vector;
calculating an initial value for a velocity vector that results from transitioning to the target acceleration vector;
adjusting components of the velocity vector to account for variances in the times to achieve the target acceleration vector; and
in response to an iteration count being below an iteration threshold and the target acceleration vector converging with the velocity vector, estimating a second value for the target acceleration vector to be evaluated during a next iteration.

8. A method, comprising:
determining that an aircraft is landing based on a distance of the aircraft to a zero speed indicator and whether the aircraft is configured for landing;
in response to determining that an aircraft is landing:
calculating where to locate a zero speed indicator on a display in the aircraft based on current flight characteristics by:
calculating a first target acceleration vector according to an azimuth dependent solution;
calculating a second target acceleration vector according to an azimuth independent solution; and
selecting one of the first target acceleration vector, the second target acceleration vector, or a combination of both the first target acceleration vector and the second target acceleration vector based upon the current flight characteristics of the aircraft, and whether the azimuth dependent solution converges; and
calculating a distance from a current location of the aircraft to a zero speed location, based on a location where the selected target acceleration vector is achieved; and
displaying the zero speed indicator at the zero speed location, wherein the zero speed indicator further indicates a location where the aircraft is calculated to reach zero horizontal speed and zero altitude according to a reference glide path based on flight characteristics determined via navigational systems included in the aircraft.

9. The method of claim 8, wherein the zero speed indicator is displayed relative to a map in an instrument panel that includes the location where the aircraft is to reach zero horizontal speed and zero altitude.

10. The method of claim 8, wherein the zero speed indicator is displayed relative to a field of view in a heads up display that includes the location where the aircraft is to reach zero horizontal speed and zero vertical speed; and
wherein display of the location where the aircraft is to reach zero horizontal speed is geo-correlated and conformal to a view outside of the aircraft.

11. The method of claim 8, further comprising:
displaying a landing zone indicator at a second location corresponding to coordinates preselected in a flight plan for where the aircraft is to land;
wherein projecting the zero speed indicator after the landing zone indicator in a direction of travel for the aircraft indicates that the aircraft will reach zero forward speed in the direction of travel after the aircraft passes the coordinates according to the flight characteristics; and
wherein projecting the zero speed indicator before the landing zone indicator in the direction of travel for the aircraft indicates that the aircraft will reach zero forward speed in the direction of travel before the aircraft passes the coordinates according to the flight characteristics.

12. The method of claim 8, wherein the location where the aircraft is calculated to reach zero horizontal speed is calculated by:
calculating a first distance from a current location of the aircraft to a first location where the aircraft reaches a target acceleration vector;
calculating a second distance from the first location to a second location where the aircraft reaches zero speed by decelerating according to the target acceleration vector; and
summing the first distance and the second distance to determine a total distance from the current location to a zero speed location, where the zero speed indicator is located.

13. The method of claim 8, further comprising determining that the aircraft is within a descent profile by:
determining that a forward speed of the aircraft is below a speed and deceleration threshold for terminal guidance; and
determining that at least one of a propeller nacelle, thrust vectoring system, or propulsor of the aircraft is rotated to a down-thrust position from a back-thrust position and landing gear is deployed.

14. A non-transitory memory storage device including instructions that when executed by a processor perform an operation comprising:
determining current flight characteristics for an aircraft via navigational sensors included in the aircraft;
calculating where to locate a zero speed indicator on a display in the aircraft based on the current flight characteristics by:
calculating a first target acceleration vector according to an azimuth dependent solution;
calculating a second target acceleration vector according to an azimuth independent solution;
selecting one of the first target acceleration vector, the second target acceleration vector, or a combination of both the first target acceleration vector and the second target acceleration vector based upon the current flight characteristics of the aircraft, and whether the azimuth dependent solution converges; and
calculating a distance from a current location of the aircraft to a zero speed location, based on a location where the selected target acceleration vector is achieved; and
projecting the zero speed indicator on the display at the zero speed location.

15. The memory storage device of claim 14, wherein the operation further comprises:
projecting a landing zone indicator at a location on the display corresponding to coordinates preselected in a flight plan for where the aircraft is to land;
wherein projecting the zero speed indicator after the landing zone indicator in a direction of travel for the aircraft indicates that the aircraft will reach zero forward speed in the direction of travel after the aircraft passes the coordinates according to the current flight characteristics; and wherein projecting the zero speed indicator before the landing zone indicator in the direction of travel for the aircraft indicates that the aircraft will reach zero forward speed in the direction of travel before the aircraft passes the coordinates according to the current flight characteristics.

16. The memory storage device of claim 14, wherein the operation further comprises, in response to determining that the aircraft is within a descent profile based on the current flight characteristics:

projecting a vertical deviation cue in the display in association with the zero speed indicator; and projecting a descent command indicator in the display, wherein a color or pattern of the descent command indicator is based on whether the descent profile for the aircraft indicates that the aircraft will exceed a sink rate limit for the aircraft to achieve a zero-zero landing.

17. The memory storage device of claim 14, wherein the zero speed indicator is displayed relative to a map in an instrument panel that includes a location where the aircraft is to reach zero horizontal speed and zero altitude.

18. The memory storage device of claim 14, wherein calculating where to locate the zero speed indicator further comprises:

determining a limit for current aircraft acceleration;

calculating the first target acceleration vector based on the limit for current aircraft acceleration and according to the azimuth dependent solution; and calculating the second target acceleration vector based on the limit for current aircraft acceleration and according to the azimuth independent solution to accommodate those instances where the azimuth dependent solution does not converge upon a value for the first target acceleration vector.

19. The memory storage device of claim 14, wherein the memory storage device is included in the aircraft.

* * * * *